(12) United States Patent
DiDomenico

(10) Patent No.: US 7,697,219 B2
(45) Date of Patent: Apr. 13, 2010

(54) NON-IMAGING FACET BASED OPTICS

(75) Inventor: Leo David DiDomenico, Livermore, CA (US)

(73) Assignee: Xtreme Energetics Inc., Livermore, CA (US)

( * ) Notice: Subject to any disclaimer, the term of this patent is extended or adjusted under 35 U.S.C. 154(b) by 341 days.

(21) Appl. No.: 12/008,053

(22) Filed: Jan. 8, 2008

(65) Prior Publication Data
US 2008/0165437 A1 Jul. 10, 2008

Related U.S. Application Data

(60) Provisional application No. 60/879,657, filed on Jan. 10, 2007.

(51) Int. Cl.
*G02B 17/00* (2006.01)
(52) U.S. Cl. ..................... 359/728
(58) Field of Classification Search ............ 359/709, 359/726, 728; 362/327, 341, 346
See application file for complete search history.

(56) References Cited

U.S. PATENT DOCUMENTS

| 4,120,565 | A | 10/1978 | Rabl et al. |
| 4,337,759 | A | 7/1982 | Popovich et al. |
| 5,404,869 | A | 4/1995 | Parkyn, Jr. et al. |
| 5,577,492 | A | 11/1996 | Parkyn, Jr. et al. |
| 5,577,493 | A | 11/1996 | Parkyn, Jr. et al. |
| 5,613,769 | A | 3/1997 | Parkyn, Jr. et al. |
| 5,655,832 | A | 8/1997 | Pelka et al. |
| 5,676,453 | A | 10/1997 | Parkyn, Jr. et al. |
| 6,252,155 | B1 | 6/2001 | Ortabasi |
| 6,639,733 | B2 | 10/2003 | Minano et al. |
| 6,896,381 | B2 | 5/2005 | Benitez et al. |
| 7,068,446 | B2 * | 6/2006 | Jacobson et al. ............ 359/726 |
| 7,212,347 | B2 * | 5/2007 | Pentico et al. ............ 359/625 |
| 2007/0240705 | A1 | 10/2007 | Papadopoulos |

OTHER PUBLICATIONS

Schreiber et al, "Micro-Optics for LED Light Sources", Photonik International 2006, pp. 111-113.
Kudaev et al, "Automated Optimization of Non-Imaging Optics . . . ", Proc.of SPIE, 59620B-1 to 9, 2005.
Kudaev et al, Parametric Design of Non-Imaging Colli-mators, SPIE-OSA, vol. 6342, 634212-1 to 8, 2006.

* cited by examiner

*Primary Examiner*—Alicia M Harrington
(74) *Attorney, Agent, or Firm*—Leighton K. Chong

(57) ABSTRACT

A high efficiency and compact optical device comprising two or more active and resonating optical facet surfaces defined by a three-dimensional representation and configured to provide a three-dimensional device. A focal region, remote from the optical surfaces and non-contiguous therewith, is defined by two or more active optical resonant surfaces, at least one of which is self-resonant. The optical surfaces in general do not have a continuous second derivative and are defined by a piecewise continuous surface function providing radially directed facets. The optical device comprises a transparent dielectric body with its optical surfaces being formed on the surfaces of said transparent dielectric body. A light transducer may be located at a focal region to provide an energy conversion. A light source having a physical extension in space, such as an LED, may be located at the focal region to provide collimation. In some embodiments the active surfaces may be chosen to transform incident radiation into a predetermined shape and having a predetermined spatial power distribution.

15 Claims, 21 Drawing Sheets

(Present Invention)

NON-IMAGING FACET BASED OPTICS

CROSS-REFERENCE TO RELATED APPLICATIONS

This invention claims the benefit of U.S. provisional patent application: U.S. 60/879,657 filed by the inventor, Leo D. DiDomenico, on 2007 Jan. 10, and entitled "Non-Imaging Faceted Light Concentrator". U.S. provisional patent application 60/879,657 is hereby incorporated in the present disclosure in its entirety and for all purposes in this patent disclosure.

FEDERALLY SPONSORED RESEARCH

Not Applicable

SEQUENCE LISTING OR PROGRAM

Not Applicable

BACKGROUND OF THE INVENTION

1. Field of Invention

This invention relates to facet-based, compact, and high-efficiency optical concentrators, collimators, reflectors, and couplers that do not, in general, preserve the point-to-point ordering of the input light rays so that maximum power transfer from a first aperture to a second aperture is achieved.

2. Prior Art

The physical processes that are available to the designer of a light concentrator are limited. Following what has become convention in the field of optical concentration we shall give letter designations to different processes used for controlling light: surface Refraction (R), surface reflection (X), total Internal reflection (I), Diffraction (D), volume refraction due to Gradients in refractive index (G). A concentrator is then classified by the primary mechanisms that are used to implement the concentration. Secondary processes comprising less than 50% of the optical interactions are typically not listed.

For example, a simple concentrating lens having two refractive surfaces with a constant refractive index in between the surfaces is described as an RR (or $R^2$) concentrator; while a cassegrainian-like two mirror concentrating system that is immersed in air is described as an XX (or $X^2$) concentrator system. The ordering of the letters, as read from left to right, is important and generally describes the order of interaction of the processes involved in the concentration of light. Therefore, a concentrator described as RX is not the same as a concentrator described as XR because the RX concentrator involves a refraction followed by a reflection while the XR concentrator involves a reflection followed by a refraction for concentration. Even if there are only two physical surfaces it may also be possible to have three or more processes of light redirection involved. For example it is possible for an RXI concentrator to use refraction, followed by a mirror reflection, and finally total internal reflection while only using two physical surfaces. Note, that this nomenclature does not distinguish between different sources of radiant energy nor does it consider the end use of the light. Also note that due to time-reversal invariance of the equations of electromagnetics a concentrator may be run "backwards" as an expander or collimator of light (the opposite of a concentrator) such as might be useful for illumination applications from a small lamp, however, the left-to-right ordering of the categorizing letters is always meant to imply concentration in this document. With this systematic notation we can easily categorize the types of solar concentrators that exist in the prior art and then compare them to the current invention.

A canonical problem in the area of non-imaging optics is how to design ultra-efficient concentrators, collimators, and other power transfer devices, which are manufacturable, compact, robust, cost effective, and producible in large volumes. There are a number of concentration techniques that are available in the literature. However, most of these techniques use a two-parameter bundle of input rays for their design. In contradistinction, the present invention uses the full extended phase space for the design. In particular, the present invention deals predominantly with concentrators typically of type $I^2$, $I^3$, $I^4$, and $I^N$ (where usually $N \geq 2$ and an integer).

The following are a list of the issued patents that use a variety of different techniques for concentration. It is observed that these patents, clearly do not anticipate, teach, or show in any way, the use of a large-area non-planar facet surface morphology for concentrating light by predominantly Total Internal Reflections.

U.S. Pat. No. 4,120,565 issued to Arnulf Rabl and Veronika Rabl on 1978 Oct. 17 deals with concentrators of type $I^2$, which only use two total internal reflection redirections. However, this prior art addresses only a very specific from of optical facet having both a right-angle at each facet apex and linear flat surfaces on the facet sides. Although these concentrators are based on total internal reflections they are also substantially in error with respect to what physics is needed to actually implement a high concentration lens design. In particular, this prior art will always have a concentration that is strictly less than the theoretical limit imposed by physics because it has intrinsic astigmatism due to the strict use of right angles and flat surface facets in their patent. The resulting astigmatism is seen in FIG. 9. Finally, this prior art is also unable to provide any shaping of the resulting focused light spot.

U.S. Pat. Nos. 4,337,759; 5,404,869; 5,577,492; 5,577,493; 5,613,769; 5,676,453 and 5,655,832 issued in various combinations to John M. Popovich, William A. Parkyn Jr., and David G. Pelka deal with concentrators of type I, IR, and $IR^2$ having large numbers of relatively small facets compared to the diameter of the lens. The non-imaging lenses they consider are also limited by the extreme sharp or acute angles of the facets making it very hard to manufacture. Additionally, the approaches presented in their patent are not capable of reaching the highest possible concentration because the focal region is typically placed in the air not the dielectric so that the advantages of a refractive index greater than unity are not exploited.

U.S. Pat. No. 6,252,155 issued to Ugar Ortabasi on Jun. 6, 2001 deals with concentrators of type RGXGX, which are based on the classical compound parabolic concentrator and are not capable of being made physically compact and also require multiple distinct parts for fabrication instead of just one compact transparent dielectric part.

U.S. Pat. No. 6,639,733 issued to Juan C. Minano, Pablo Benitez, Juan C. Gonzalez, Waqidi Falicoff, and H. J. Caulfield of Light Prescriptions Innovators LLC on Oct. 28, 2003 deals with concentrators of type RR, RX, RXI, $X^2$, and XR. The concentrators of this prior art invention are limited by being restricted to: optical surfaces having continuous second derivatives; small or micro-structured facets; flat facets; facets that are based on complimentary pairs or sub-facets that must include both an active facet and an inactive facet; facets that are characterized by a deflection laws based on reflection from a mirrored facet surface, refraction from a refractive facet surface, and a combination of reflection and refraction from facets having mirrored and refractive surfaces; an extended phase-space design restricted to two spatial coordinates and one momentum coordinate for the input light bundle of rays as well as the design of the concentrator; and facets that are configured to exist only as concentric annuli around the optical axis. In all distinguishing cases just listed the present invention is different and teaches a different means to achieve concentration and collimation of light. In particular, the present invention deals predominantly with concentrators typically of type $I^2$, $I^3$, $I^4$, and $I^N$ (where usually $N \geq 2$ and an integer). In general, the present invention uses at least one surface that has discontinuous second derivatives at periodic or non-periodic coordinate locations; large facets; curved facets; complimentary pairs of facets that only have active facet faces; facets that are characterized by a deflection law based on reflection from unmirrored facet surfaces using only total internal reflection; a design that demands working in a five dimensional extended phase space even if the input bundle of rays is restricted to two spatial coordinates and one momentum coordinate for the input bundle of rays; and each facets is configured to exist predominantly over a limited range of azimuthal angles $\Delta\phi$ instead of 360 degree for the prior art.

U.S. Pat. No. 6,896,381 issued to Pablo Benitez, Juan C. Minano, Fernando Munoz of Light Prescriptions Innovators LLC. on 2005 May 24 deals with concentrators of type RXIR, which is different than the present invention of $I^N$ type concentrators because there are no self-resonant facet surfaces.

Juan C. Minano in J. Opt. Soc. Am. A/Vol. 2 No. 11 pp 1826 shows an $R^3$ type concentrator called a compound triangular concentrator, and in J. Opt. Soc. Am. A/Vol. 3 pp 1345 shows an RG type type Graded Refractive Index (GRIN) concentrator. Many other examples can be found and examined in detail by Prof. Roland Winston et. al. in the text "Nonimaging Optics", ISBN: 0-12-759751-4, published by Elsever in 2005. Each of the references listed previously has one or more of the following disadvantages, while the present invention reduces or eliminates these disadvantages.

The first disadvantage of the prior art is that they use a large area of mirrored surfaces for the primary reflecting surface. These mirrored surfaces provide a failure mode for microcracks and mirror detachments to attack the optical system—especially over extended time periods (decades) of thermal cycling. The present invention overcomes this limitation by predominantly using Total Internal Reflection (TIR) on one or more surfaces to minimize or, in some embodiments, completely eliminate mirrored surfaces altogether.

The second disadvantage of the prior art that it does not have a built in means to control the shape of the final light spot at the output focal region. The present invention overcomes this limitation in some embodiments by shaping each facet in a slightly different way in order to facilitate a match between the shape of the focused light spot on a receiving device, located at the output aperture focal region, and the shape of said device itself—such as a photovoltaic cell.

The third disadvantage of the prior art is that it is not transparent and therefore there is no means to provide a visual representation of colors and textures that are located behind, and noncontiguous with, the concentrator to a remote observer by indirect lighting or by active light sources behind the concentrator. The prior art is therefore less aesthetically appealing to humans and is less desirable for unobtrusive integration into buildings and other platforms where the aesthetic function is required. The present invention overcomes this limitation by not using much of the concentrator's area for mirrored surfaces. In some embodiments no mirrored surfaces are needed at all.

The fourth disadvantage of the prior art again results from the fact that the concentrator is not completely transparent and therefore there is no direct way to provide diffuse light to an observer or system that is behind the lens or array of concentrator lenses. For example, such a capability is needed when the lens is integrated into a window like structure that provides both concentrated direct solar energy to a photovoltaic cell as well as dispersed natural lighting. Again, the present invention overcomes this limitation by not using much of the concentrator's area for mirrored surfaces. In some embodiments no mirrored surfaces are needed at all.

The fifth disadvantage is that the prior art is not integrated with a means for dissipating the energy from thermal heating at the concentrated light spot. The present invention overcomes this limitation by using nano-structured and transparent thermal control structures typically located on the concentrator's surface near to any optically absorptive regions that get hot from concentrated light.

The sixth disadvantage is that the prior art is typically not very thin and low profile. The present invention overcomes this limitation by providing a means to fold the optics while minimizing or eliminating the need for many, and sometimes all mirrored surfaces. Folding the optics means that the required path length for focusing the light is obtained by multiple reflections within the concentrating device instead of directly by propagation without reflections.

The seventh disadvantage is that some of the prior art exhibits a lack of broad-band capability due to material and structural dispersion of light. This is especially true for systems that employ a refractive index that changes from point-to-point in the volume of the concentrator due to intrinsic material dispersion. Certain embodiments of the present invention overcomes this limitation by minimizing refraction thereby minimizing the effects of material dispersion.

The eighth disadvantage of the prior art is that it is typically difficult to manufacture. The present invention overcomes this limitation by using low cost materials that are homogenous and which may be structurally modified and fine tuned by established machining techniques as well as a number of other process that only change the shape of a one-material optical element. Furthermore, the facets of the present invention are typically large relative to the sizes of the device. This allows for easier manufacturing and a more robust and durable lens.

The ninth disadvantage of the prior art is that it does not allow for the easy formation of arrays of lenses. The present invention overcomes this limitation by providing a structure that has a facet morphology that may act as mechanical spars, which provides an integrated stiffener to keep an array of lenses optically flat even under external loads—such as from high winds or a human walking on meter-scale tiles of the concentrators.

The tenth disadvantage of the prior art is that most optical elements are rotationally or transitionally symmetric, which leads to rotational and translational skew invariance. This invariance tends to limit the concentration performance beyond that suggested by the conservation of etendue. Certain embodiments of the present invention break the rotational or translational symmetry by having different facet shapes at non periodic facet locations for the purpose of shaping the focal spot to a desired shape or for simply improving concentration performance.

The eleventh disadvantage of the prior art is that when curved facets are employed they tend to be small structures relative to the size of the largest dimension of the device and to incorporate very acute angles at their apex thereby making them difficult to manufacture and fragile. In the present invention the facets are a large fraction of the largest dimension of the device. This helps improve the manufacturability of the device.

The twelfth disadvantage is that the prior art can not provide both concentrated light and dispersed light to both a high efficiency photovoltaic cell that uses only directly concentrated light and to thin-film photovoltaic cells for dispersed light simultaneously. The present invention can because it is transparent to diffuse light.

While all of these disadvantages may not exist for any one particular prior art design all of the previously mentioned sources of prior art do suffer from one or more of the above stated deficits. However, each embodiment of the present invention incorporates the majority of the advantages alluded to above and discussed in detail throughout this document. These advantages all stem from the unique self-resonant curved facets, which provide a means for light redirection by total internal reflection.

In summary, there are a large number of prior art devices that are currently disclosed and based on Refraction (R), Reflection (X), Gradient (G) index, and total internal (I) reflection for concentrating or collimating light energy. However, none of these teaches or anticipates the present invention of a concentrating optical device, which predominantly uses multiple (N) efficient total internal reflections $I^N$ in a high dimensionality phase-space design. The current invention incorporates large non-linear facets that provide very large optical efficiencies, large angles of acceptance, shaping of the focal spot, manufacturability and a compact design. Thus the prior art is seen to have multiple deficiencies, which are addressed and overcome in the present invention.

OBJECTS AND ADVANTAGES

Accordingly several objects and advantages of the present invention are:

(a) to provide a non-imaging lens that predominantly uses the process of total internal reflection for concentration, collimation, or redirection of light;

(b) to provide a non-imaging lens that has its output focal region and power distribution controllable by design of the facet shape;

(c) to provide a non-imaging lens that reflects light to the focal region when said light is input predominantly normal to an input aperture;

(d) to provide a non-imaging lens that easily integrates transparent electrical and thermal control materials such as, but not limited to, transparent carbon nanotubes, Zinc Tin Oxide, or Indium Tin Oxides;

(e) to provide a non-imaging lens that folds its optical function so that it maintains a relatively thin and compact geometry using predominantly one optical material;

(f) to provide a non-imaging lens that is capable of processing broad-band optical radiation with little material dispersion;

(g) to provide a non-imaging lens that is easily manufacturable by a number of alternative techniques, such as but not limited to, injection molding and press forming using a rolling process;

(h) to provide a non-imaging lens that is easily integrated in to arrays of non-imaging lenses having significant mechanical resistance to deformation;

(i) to provide a non-imaging lens that may easily break rotational or translational symmetry in order to maximize concentration by minimizing optical skew invariance;

(j) to provide a non-imaging lens that uses a small number of robust large scale facets instead of many small and hard to manufacture facets;

(k) to provide a non-imaging lens that can have a high concentration photovoltaic cell inserted at its focal region;

(l) to provide a non-imaging lens that can couple concentrated light out into a an optical light pipe for distribution to a remote location.

(m) to provide a non-imaging lens that can focus light for solar thermal, photovoltaic, and liquid fuels production via photo-chemical processes.

(n) to provide a non-imaging lens that has scalability.

(o) to provide a non-imaging lens that has durability due to its one material shaped form design.

Further objects and advantages will become apparent from a consideration of the ensuing description and drawings.

DEFINITIONS

"Acceptance Solid Angle" as used herein refers to the maximum half-angle subtended by a cone of rays having an apex at a specific point on the input aperture of an optical device.

"Bottom Focal Region (BFR)" as used herein refers to a concentrator's focal region being substantially near the bottom surface of a concentrating device.

"Collection" as used herein refers to the optical process of gathering solar energy into an optical system. It is separate and distinct from aggregation, concentration, distribution, and energy conversion processes.

"Concentration" as used herein refers to the optical process of increasing the flux, or flow, of light through a given area. In solar applications it is often given in terms of the number of suns of equivalent flux, where unity concentration or one sun of concentration is equivalent to 1000 Watts per square meter peak. It is separate and distinct from collection, aggregation, distribution, and energy conversion processes.

"Distribution" as used herein refers to the process of routing light, which is passing through a common input cross sectional area, and guiding it to a common output cross sectional area. It is separate and distinct from aggregation, collection, and concentration.

"End Use Energy Product" as used herein refers to the output of a solar energy conversion process. Examples include natural sunlight (trivial case with no energy conversion), electricity, hydrogen or other gas or liquid fuels, and heat.

"Edge Rays" as used herein refers to ray trajectories that are defined in an optical momentum phase space at the physical input and output apertures—in real 3-dimensional space. These rays correspond to the maximum extent in position while the momentum varies over its expected range as well as those rays having a maximum extent in momentum while the position varies over its expected range. For example, at the input aperture of a solar concentrator a cone of rays having its apex on the input aperture and having an acceptance solid angle that is matched to the sun contains edge rays, in particular there are two cases. The first case is when the cone-of-rays has its apex strictly inside the aperture, then the edge rays are only those rays on the cone-of-rays surface—this is the case shown in this patent for illustration purposes due to the ease of tracing this small number of rays. The second case is when the cone-of-rays in on the physical edge of the input aperture, then the edge rays also include all the rays that are also inside of the cone-of-rays.

"Etendue" as used herein refers to a physically conserved quantity of an optical system that determines the relation of concentrated area and solid-angle extent as light propagates. It is mathematically the integrated phase space volume that a bundle of rays traverses in an optical momentum phase space. Furthermore, this is approximately the product of the solid-angle of light-cones times the area of the aperture under consideration.

"Extended Phase Space" as used herein refers to adding the general coordinate of propagation to the coordiantes of phase space. For example, if the Phase space has coordinates of $\{x, y, p_x, p_y\}$ then the extended phase space has coordinates $\{x, y, p_x, p_y\}$. Note that $p_z$ depends on $p_x$ and $p_y$ because the magnitude of the photon momentum is a known quantity if its energy is known and the refractive index of the medium is know because $p_x^2 + p_y^2 + p_z^2 = p^2$, where p is the known magnitude of the optical momentum equal to the refractive index of the medium that the light traverses. Note that $p_z$ is sometimes included in plots for completeness.

"Facet" as used herein refers to an optical structure having a kink in its surface that produces a discontinuous second derivative and provides a means for a single surface containing said kink to be self-resonant or to be mutually resonant with another surface which may or may not have kinks producing a discontinuous second derivative.

"Geometric Facet Angle (GFA)" as used herein refers to the angle subtended by the apex of a facet and is the projection of the Light Facet Angle onto a plane making an angle to the optical axis equal to the slope of the defining characteristic curve. See FIG. 2.

"Light-Cone" as used here in refers to a bundle of rays on or filling a mathematical cone and having a common mathematical source or sink point located at the apex of said cone. Concentrators must accept light of a specific solid-angle with a specific input direction if the concentrator is to perform its function of concentrating light. If the solid-angle of a cone of rays, or the direction about which a cone of rays is prescribed, is not optimally chosen then light is rejected from the desired path of the concentrator.

"Light Facet Angle (LFA)" as used here in refers to the apex angle of a facet as measured on a plane tangent to a cylinder around the optical axis, said plane also containing the light rays that are parallel to the optical axis. See FIG. 2.

"Middle Focal Region (MFR)" as used herein refers to a concentrator's focal region being between, and substantially removed from, the upper and lower surfaces of the concentrating device.

"Optical Momentum" is the product of the magnitude of a single photon's intrinsic quantum momentum, the local refractive index, and the unit vector tangent to the path of the photon and corresponding to the direction of a ray.

"Opposing Optical Surfaces" as used herein refers to surfaces that may receive light through a process of multiple reflections, refractions, and/or diffractions among the surfaces.

"Phase Space" (as compared to Extended Phase Space c.f above.) as used herein refers to the position and optical momentum coordinates of a photon at the input aperture. The position is given in terms of a two generalized position coordinates and the momentum is given in terms of two direction cosines relative to the iso-contours of the generalized coordinates. All optical inputs in the present invention refer to a 4-dimensional phase space. If propagation over time is in the general z-direction then one example of the phase space coordinates is the set $\{x, y, p_x, p_y\}$.

"Protected Total Internal Reflection (PTIR)" as used herein refers to an optical surface that provides Total Internal Reflection and is shielded from environmental elements like dirt or aerosols, which would adhere to said optical surface and reduce the efficiency of the Total Internal Reflection process.

"Resonant Surfaces" as used herein refers to optical surfaces that reflect a ray of light more than once.

"Self Resonant" as used herein refers to a special case of a resonant surface which reflects light form one part of the surface to another part of the same surface without using an intermediate, and noncontiguous, surface as part of the redirection process. The facets in this invention are self-resonant.

"Total Internal Reflection (TIR)" as used herein refers to an optical phenomenon that occurs when a ray of light strikes a medium boundary at an angle larger than a critical angle with respect to the normal to the surface and characterized by the ratio of the refractive indices of the media on each side of the boundary. If the refractive index is lower on the other side of the boundary than the side the ray originally propagates within, then no light can pass through the optical boundary and is perfectly reflected with essentially no loss so that all of the light is reflected. The critical angle is the angle of incidence above which the total internal reflection occurs and its functional form is derivable from Snell's law of reflection.

"Top Focal Region (TFR)" as used herein refers to a concentrator's focal region being substantially near the top surface of a concentrating device.

"Unprotected Total Internal Reflection (UTIR)" as used herein refers to an optical surface that provides Total Internal Reflection and is not shielded from environmental elements like dirt or aerosols, which would adhere to said optical surface and reduce the efficiency of the Total Internal Reflection process.

Physical Principles

Non-imaging optics may be used to collect, concentrate, convey, and distribute light energy from a remote source onto a receiver having a smaller area then the input aperture of the concentrator. It also provides a means to solve the reverse problem of taking light from a small device, such as a LED or laser and to collimate and redirect and collimate that light to a remote location. In both cases not only is it desired to redirect the light energy it is also desired to control the distribution of the light energy to achieve a particular goal. Typically the point-to-point ordering property of light, which is common for imaging optics is abandoned in favor of providing the best possible concentration of the light energy using a compact optical device. Other characteristics like acceptance and transmittance solid angles and as well as the overall losses due to absorption and reflections are also often part of the design considerations. Note, from this point forward, unless otherwise specified, I will only discuss the case of concentration, nonetheless it is to be understood that collimation, redirection, expansion, and other forms of light energy manipulation are also included herein.

This invention discloses the $I^N$ type of concentrator, which predominantly use efficient total internal reflection at two, three, four, five or even more TIR redirections within the concentrator. The $I^N$ (N a positive integer) non-imaging concentrators are desirable because of their easy manufacturability, having reduced needs for expensive, lossy, and micro-crack/pealing prone mirror technology to be included and are novel because of the highly unobvious nature of the shaped surface that is needed to realize the designs. Other systems, which exploit mirrors, especially over large surface areas, can have intrinsic losses that range from about 1% (or very costly mirrors) to as high as 20% (or very cheap mirrors), while the preferred embodiment of the present invention typically has about 1% of loss when anti-reflection coatings also incorporated.

Consider a new class of non-imaging solar concentrator, which is based on prismatic facets like those shown in FIG. 3. These facets reflect light with nearly 100% efficiency using the principle of Total Internal Reflection (TIR) at the boundary of a transparent dielectric and air, thereby allowing higher efficiencies than solar concentrators that use low-cost metallic mirrors, which typically have more than 5% of ohmic loss per bounce.

Consider a single facet as depicted in FIGS. 1-2. The functions that define the facet are given in terms of a cylindrical coordinate system (r, φ, z). A prismatic facet is represented by a boundary surface between the dielectric of the concentrator and the media below, which is typically air, but could be any material having a lower refractive index than that of the first dielectric. The objective is to have light, which is assumed to be moving in the negative z-direction, impinge upon the facet in such a way as to ensure that one or more reflections of the light by Total Internal Reflections (TIR) are obtained while forcing the light to focus to a focal region. This will allow a low-loss and low-cost concentrator to be build that does not need a primary mirrored surface.

There are many potential paths to the creation of a mathematical model for the lens of the present invention. The results for the different design approaches will essentially be the same and therefore the following specific analysis is not to be construed as in anyway limiting the general spirit of the present teaching. In order to develop a mathematical model of the prism let us agree to call the function that defines the lower part of the facet, the part that is closer to the "ground", g(r). Additionally, let the function that is "higher" than g(r) be called h(r). Furthermore, I will assume that the facet formed by these space-curve functions is defined by first keeping g(r) fixed over the x-axis. That is, g(r) is kept at a polar angle of φ=0 in the xy-plane. The function h(r) is split into two new curves by rotating h(r), which is initially at a polar angle of φ=0 as indicated FIG. 1 and FIG. 2, about the z-axis by ±Δφ so that two new curves are created. These two new curves are clearly shown as the upper curves in the facet in FIG. 2.

Next, consider the perspective image of the facet geometry in FIG. 2. At each value of r the facet can be described by a facet angle. However, there are two possible definitions of a facet angle that are useful under different circumstances. Because light is initially traveling more or less parallel to the z-axis we are often interested in the facet angle cut by planes that are tangent to cylinders around the z-axis. This is useful because it helps us determine if the light will be totally internally reflected at the first bounce from the facet. We shall call this the Light Facet Angle (LFA) and denote it by the symbol ψ.

Alternately, the facet angle defined by the plane containing the points $P_3 P_1 P_2$, which also contains the line $P_1 P_9$, is useful because this is the angle that would be used in a lofting operation in a mechanical CAD system and it more naturally defines the facet angle from a purely geometrically point of view. I shall call this the Geometric Facet Angle (GFA) and represent it by the symbol Ψ.

Let $R_0$ be the position vector along the curve z=g(r) at φ=0 and x=t. Also, let $R_{M_\phi}$ be the position vector along the curve z=h(r) at φ=±Δφ. These three curves define the fixed space curves that can be used to "stretch" a surface to define the hull of the facet. To describe the facet hull we need to construct a parametric function to represent the hull surface.

In particular, we can begin by defining a linear hull. By this I mean that the hull formed by connecting h(r) to g(r) by using an infinite number of straight line segments. The points on this surface can easily be defined by vector algebra so that $$R(r, \phi) = R_0(r) + \frac{\phi}{\Delta\phi}\left[R_{M_\phi}(r) - R_0(r)\right], \quad (1)$$

which is only valid over the triangular wedge shaped domain $0 \leq \phi \leq \Delta\phi$ and $0 \leq r \leq r_{max}$. Note that we will eventually have to augment this definition using the symmetry properties of the prism facet to allow for $-\Delta\phi \leq \phi \leq \Delta\phi$. This domain is clearly seen in the xy-plane in FIG. 2. Furthermore, by inspection of FIG. 1 we can see that if we initially choose the r coordinate to run along the x-axis then in the xyz-coordinate basis $$R_0(r) = <r, 0, g(r)>, \quad (2)$$

and $$R_{M_\phi}(r) = <r \cos(\Delta\phi), r \sin(\Delta\phi), h(r)>, \quad (3)$$

where $M_\phi$ represents the total number of discrete curves used not including g(r), which are numbered from 1 to $M_\phi$. Therefore the last of the set of discrete curves is located at $\phi = \phi_{M_\phi}$ that will eventually represent the curved hull surface. Therefore, Eq. 1 is based on only the very first and last of the possible set of space curves (j=1 and j=$M_\phi$ respectively), which are used to describe the full three dimensional shape of the curved hull surface in FIG. 2.

Additionally, the functions g(r) and h(r) are not independent of each other because we are specifying the facet-angle 2Δφ as part of the design. I will now determine how g(r) and h(r) are mathematically connected to each other. It is convenient to define the slope angle of g(r) as α so that $$\tan\alpha = \frac{dg(r)}{dr}. \quad (4)$$

Referring to FIG. 2, the LFA is defined by the equation $$\tan\left[\frac{\psi}{2}\right] = \frac{\overline{P_5 P_7}}{\overline{P_1 P_7}}, \quad (5)$$

while the GFA is defined by $$\tan\left[\frac{\Psi}{2}\right] = \frac{\overline{P_3 P_9}}{\overline{P_1 P_9}}. \quad (6)$$

Obtaining these equations in terms of the user controllable input parameters is an exercise in geometry. From FIGS. 1-2 we see that $$\overline{P_1 P_7} = h(r) - g(r), \quad (7)$$

$$\overline{P_1 P_8} = [h(r) - g(r)] \cos\alpha, \quad (8)$$

$$\overline{P_6 P_7} = [h(r) - g(r)] \sin\alpha \cos\alpha, \quad (9)$$

$$\overline{P_6 P_{13}} = \overline{P_7 P_{13}} - \overline{P_6 P_7}, \quad (10)$$

$$\overline{P_3 P_9} = \overline{P_9 P_{12}} \tan(\Delta\phi), \quad (11)$$

$$\overline{P_5P_7} = \overline{P_7P_{13}}\tan(\Delta\phi), \quad (12)$$

$$\overline{P_7P_{13}} = r, \quad (13)$$

$$\overline{P_9P_{12}} = \tilde{r}, \quad (14)$$

Also note that to find the location of the point $P_9$, and hence the distance $\overline{P_9P_{12}}$, we must find the equation of the line $\overline{P_1P_9}$ and then solve that equation for the intersection point on $z=h(r)$ at $\phi=0$. In particular, the equation of the line along $\overline{P_1P_9}$ is $$z - g(r) = (-\cot\alpha)(x - r), \quad (15)$$

and setting $z=h(\tilde{r})$ and $x=\tilde{r}$ we find that we must numerically solve the following equation for $\tilde{r}$ $$h(\tilde{r}) + \tilde{r}\cot\alpha = g(r) + r\cot\alpha, \quad (16)$$

where $\tilde{r}$ is the radial distance to the point $P_9$, $r$ is the radial distance to the point $P_1$, and the right hand side is completely known. Hence, $$\overline{P_1P_9} = \sqrt{[r-\tilde{r}]^2 + [h(\tilde{r}) - g(r)]^2}. \quad (17)$$

Combining these relationships we find that $h(r)$ is expressed in terms of $h(r)$ and the LFA $\psi$ by $$h(r) = g(r) + r\frac{\tan(\Delta\phi)}{\tan\left(\frac{\psi}{2}\right)}. \quad (18)$$

Alternately, we find that $g(r)$ and $h(r)$ are related to each other through the GFA $\Psi$ when $$h(\tilde{r}) = g(r) + \sqrt{\left(\tilde{r}\frac{\tan(\Delta\phi)}{\tan\left(\frac{\Psi}{2}\right)}\right)^2 - (r-\tilde{r})^2}. \quad (19)$$

Unfortunately, this last equation is not a closed analytical relation because it requires that Eq. 16 is numerically solved first. Worse still is the fact that $r$ is not directly related to $\tilde{r}$ by an analytical expression so that $h(\tilde{r})$ is not easily evaluated at $r$. To overcome this shortcoming one could first solve Eq. 16 to create a look-up table and then use that table to write $\tilde{r}$ as an interpolated function of $r$ so that $\tilde{r} = \tilde{r}(r)$.

Although this computational geometry approach can be programmed into a computer it is often nice to have a closed analytical expression so that other analytical analysis becomes possible. This can be achieved by an appropriate approximation to Eq. 19. Clearly Eq. 19 reduces to Eq. 18 when $\Psi \approx \psi$ and $\tilde{r} \approx r$. However, we can achieve a closed form analytical expression involving $\Psi$ (not $\psi$) by noting that for $r$ not near the central optical axis we can use the approximation $$\frac{\overline{P_8P_9}}{\overline{P_1P_8}} \ll 1. \quad (20)$$

Therefore, $$\tan\left[\frac{\psi}{2}\right] = \frac{\overline{P_3P_9}}{\overline{P_1P_9}} \quad (21)$$

$$= \frac{\overline{P_3P_9}}{\overline{P_1P_8} - \overline{P_8P_9}}$$

$$\approx \frac{\overline{P_9P_{12}}\tan(\Delta\phi)}{\overline{P_1P_8}}$$

$$= \frac{[\overline{P_6P_{13}} + \overline{P_8P_9}\sin\alpha]\tan(\Delta\phi)}{\overline{P_1P_8}}$$

$$\approx \frac{\overline{P_6P_{13}}\tan(\Delta\phi)}{\overline{P_1P_8}}$$

$$= \frac{(\overline{P_7P_{13}} - \{[h(r) - g(r)]\sin\alpha\cos\alpha\})\tan(\Delta\phi)}{[h(r) - g(r)]\cos\alpha},$$

setting $\overline{P_7P_{13}} = r$ and solving for $h(r)$ we obtain $$h(r) = g(r) + \frac{r\tan(\Delta\phi)}{\left\{\tan\left[\frac{\Psi}{2}\right] + \tan(\Delta\phi)\sin\alpha\right\}\cos\alpha}. \quad (22)$$

Also note that we can use Eqs. 18 and 22 and connect $\psi$ and $\Psi$ through $$\tan\left[\frac{\psi}{2}\right] = \left(\tan\left[\frac{\Psi}{2}\right] + \tan(\Delta\phi)\sin\alpha\right)\cos\alpha. \quad (23)$$

Additionally, note that at $r=0$ we have that $h(0)=g(0)=0$ so that we have discovered that $\overline{P_{10}P_{11}}=0$. The above analysis represents a linear model for the prism facets. The grooves of the prism essentially forming a liner corner-cube like TIR reflector. This can be seen as the "Linear Segments" depicted in FIG. 2.

The linear design can be generalized to account for facet shapes that are not defined by straight lines connecting the lower curve $g(r)$ to the upper curve $h(r)$. To achieve this "curved hull" design we must allow for the line segments $\overline{P_1P_4}$ and $\overline{P_1P_5}$ to flex or bend into curves with a desired focusing property. As we shall see Eq. 1 is actually a form of linear Bezier spline, which we shall be able to generalize to allow for a curved hull, as shown in FIG. 2. This Bezier will allow the location of the curves $h(r)$ at $\phi=\pm\Delta\phi$ and $g(r)$ at $\phi=0$ to remain fixed in the same locations in space as has already been established in the linear model.

Let $t$ be a parametric variable such that $t\in[0,1]$. Also, let $P_i$ be a set of vectors to points in space. Then we can build up a first order, or linear, Bezier spline according to parametric vector equation $$P_{0,1}(t) = (1-t)P_0 + tP_1. \quad (24)$$

Clearly, the vector $P_{0,1}(t)$ moves from $P_0$ to $P_1$ linearly with $t$. Note that in Eq. 1 we can readily identify $t=|\phi|/\Delta\phi$ where the domain of the prism surface function requires $\phi\in[-\Delta\phi, +\Delta\phi]$ or $t\in[0,1]$ for the case where $\phi\geq 0$. Therefore, our definition for the prism surface is only slightly different than the Bezier definition and we will therefore be able to exploit the Bezier for our purposes.

Higher order Bezier splines are built up from lower order Bezier splines. Let $P_{a,b}$ represent the position of a vector as it describes a curve starting at point $a$ and terminating on point b. Then, proceeding as indicated in the figure we write a second order spline from three equations:

$$P_{0,1}(t)=(1-t)P_0+tP_1$$

$$P_{1,2}(t)=(1-t)P_1+tP_2$$

$$P_{0,2}(t)=(1-t)P_{0,1}+tP_{1,2}, \quad (25)$$

or combining terms $$P_{0,2}(t)=(1-t)^2 P_0+2(1-t)tP_1+t^2 P_2. \quad (26)$$

While a third order Bezier is derived from $$P_{0,1}(t)=(1-t)P_0+tP_1$$

$$P_{1,2}(t)=(1-t)P_1+tP_2$$

$$P_{2,3}(t)=(1-t)P_2+tP_3$$

$$P_{0,2}(t)=(1-t)P_{0,1}+tP_{1,2}$$

$$P_{1,3}(t)=(1-t)P_{1,2}+tP_{2,3}$$

$$P_{0,3}(t)=(1-t)P_{0,1}+tP_{1,2}. \quad (27)$$

or combining terms $$P_{0,3}(t)=(1-t)^3 P_0+3(1-t)^2 tP_1+3(1-t)t^2 P_2+t^3 P_3. \quad (28)$$

So that in general an order M Bezier can be written in terms of the (M+1) points $\{P_0, \ldots, P_M\}$ as $$P(t) = \sum_{k=0}^{M} \frac{M!}{(M-k)!k!}(1-t)^{M-k}t^k P_k \quad \forall\, t \in [0, 1]. \quad (29)$$

Note that the boundary control points of the Bezier curves are the first and last points, k=0 and k=M. These points are actually on the curve while the remaining points are not on the curve and are called the internal control points. Hence, a very important property of this equation is that the end points are always on the curve, while, in general, the intermediate points are not on the curve. That is $$P(0)=P_0$$

$$P(1)=P_M. \quad (30)$$

We desire to generalize this technique for surfaces having coordinates u and v—instead of just a space-curve with a single parameter t. Furthermore, it is desired that the surface so described has boundary curves, like g(r) and h(r), along the v-coordinate well defined at v=0 and v=1. Intermediate control curves (instead of the previously described control points) then are established in order to provide the shape of the surface. We can accomplish this goal by letting $$S(u, v) = \sum_{k=0}^{M} \frac{M!}{(M-k)!k!}(1-v)^{M-k}v^k P(u, v_k), \quad (31)$$

where $v \in [0,1]$ and $u \in [0, u_{max}]$. Additionally, by direct substitution we can easily verify that two different space curves are defined, by the k=0 term, at the boundaries when v=0 or v=1.

$$S(u,0)=P(u,v_0)$$

$$S(u,1)=P(u,v_M), \quad (32)$$

These are continuous functions of u and are the fixed boundary curves or geometric boundary conditions. In our specific case we may write $$S(r, \phi) = \sum_{k=0}^{M_\phi} \frac{M_\phi!}{(M_\phi - k)!k!}\left(1 - \frac{\phi}{\Delta\phi}\right)^{M_\phi - k}\left(\frac{\phi}{\Delta\phi}\right)^k P(r, \phi_k). \quad (33)$$

Note that Eq. 1 is the same as the previous equation when the only two terms allowed in the summation are k=0 and $M_\phi$. Therefore, we can see that Eq. 1 is a first order approximation to the facet shape. Furthermore, Eq. 1 only has two control curves: g(r) and h(r), however, in the higher order model we are developing here we add more internal control curves, which are optimized by analytical methods in an extended photon momentum phase-space or by computer numerical optimization techniques.

To create a curved, i.e. non-linear, surface morphology for concentration of light each internal control curve of the higher order Bezier may need to be lifted off of the planar control surface, which is defined by Eq. 1, to provide curvature to the prism facet—creating the curved hull shown in FIG. 2. Note that the control surface of Eq. 1 is typically not planar because $\Psi=\Psi(r)$ is not a constant. The normal to this non-planar control surface is obtained by evaluation of the gradient to the surface. From the z-component of Eq. 1 we form the auxiliary function which will provide a gradient pointing in the direction of the surface perturbation $$U(r, \phi, z) = -z + g(r) + \frac{\phi}{\Delta\phi}\left\{\frac{r\tan\Delta\phi}{\left(\tan\left[\frac{\Psi(r)}{2}\right] + \tan\Delta\phi\sin\alpha\right)\cos\alpha}\right\}, \quad (34)$$

such that the z-component of Equ. 1 is contained in Eq. 34 as an iso-contour of the manifold $U(r, \phi, z)=0$. However, the gradient of this function is normal to the facet and pointing down and away from the facet, as shown in FIG. 2. Hence, the normal unit vector is given by $$N(r, \phi) = \frac{\nabla U(r, \phi, z)}{\|\nabla U(r, \phi, z)\|} \quad (35)$$

where we note that $N(r, \phi)$ is independent of z because the derivative in $\nabla U$ kills that variable. Additionally, I shall assume that a series expansion exists for the GFA in the expression for the unit normal and it is given by $$\Psi(r) = \sum_{k=0}^{N_a} a_k r^k. \quad (36)$$

The coefficients for this expansion are parameters that need to be found by a process of numerical optimization or analytic analysis on an optical momentum phase-space.

Next, recall that in cylindrical coordinates $$\nabla U(r, \phi, z) = \hat{r}\frac{\partial U}{\partial r} + \hat{\phi}\frac{1}{r}\frac{\partial U}{\partial \phi} + \hat{z}\frac{\partial U}{\partial z}. \quad (37)$$

However, $$\hat{r} = \hat{x}\cos\phi + \hat{y}\sin\phi$$

$$\hat{\phi} = -\hat{x}\sin\phi + \hat{y}\sin\phi.$$

Plugging these expressions for the polar unit vectors into Eq. 37 we obtain the gradient in terms of a cartesian coordinate basis, $$\nabla U(r, \phi, z) = \quad (39)$$
$$\hat{x}\left(\cos\phi\frac{\partial U}{\partial r} - \frac{\sin\phi}{r}\frac{\partial U}{\partial \phi}\right) + \hat{y}\left(\sin\phi\frac{\partial U}{\partial r} + \frac{\cos\phi}{r}\frac{\partial U}{\partial \phi}\right) + \hat{z}\frac{\partial U}{\partial z}.$$

Next, we observe that the control points, which are initially located on the planar control surface defined by Eq. 1, can be lifted off that control surface by using a vector. To accomplish this we use a scaling function $\Lambda$ along the unit normal vector to the planar surface $P_1P_4P_{11}P_{10}P_1$. Therefore, $$P(r,\phi)=R(r,\phi)+\Lambda(r,\phi)N(r,\phi), \quad (40)$$

where the scaling factor $\Lambda$ is positive or negative scalar and is applied along the normal vector as a continuous function of r and a discrete function of $\phi$. That is, for each discrete value of $\phi$ other than $\phi=0$ or $\phi=\Delta\phi$ we define a new control curve that lifts the surface geometry off of the first order facet. Clearly, this control contour is at a fixed angle $\phi=\phi_k$ between $\phi=0$ and $\phi=\Delta\phi$, and is continuous along the r direction.

Next, we use the sifting property of the Kronecker $\delta$-function to achieve this dichotomy in continuous and discrete variables for the scaling function so that $$\Lambda(r, \phi) = \sum_{j=1}^{M_\phi-1} \lambda(r, \phi_j)\delta(\phi - \phi_j). \quad (41)$$

Note that the summation starts on j=1 and ends on j=$(M_\phi-1)$ instead of starting on j=0 and ending on j=$M_\phi$. This is because we have already found the contours at $\phi=0$ and $\phi=\Delta\phi$, which are g(r) and h(r) respectively. Both g(r) and h(r) are fixed in space and we do not wish to change these contours any more. Only the surface "stretched" between the fixed space curves g(r) and h(r) needs any modification. Moreover, we can write $$\lambda(r, \phi_j) = \sum_{k=0}^{N_b} b_{j,k} r^k. \quad (42)$$

so that the parameters for optimization are $b_{j,k}$.

To find an optimized facet surface geometry given a design objective specified in phase-space:

Step 1: Determine the initial input parameters to the design.
$2R_{max}$—The maximum diameter of a canonical cylindrically symmetrical concentrator. For example, this sets the maximum amount of solar energy that can be harvested from the sun.

$2\Delta\phi$—This is the total angular extent of the prism facet. The larger the angular extent of the facet the fewer facets needed but the larger the depth of the facet required for the design and the greater the curvature in the facets. Large facets are typically considered to be better for good manufacturability.

$\Psi$—The Geometric Facet Angle (GFA) is the angle that the planar facet makes at its apex. Typically the starting value for the design is $\Psi=\pi/2$ radians and this changes as the design process proceeds. The GFA determines to what extent the rays from each side of the prism facet ar parallel after TIR has occurred. For a concentrator with a curving lower profile the GFA will need to be made smaller than $\pi/2$ to achieve parallel rays after the TIR bounces. The GFA is a strong function of the distance away from the optical axis.

$M_\phi$—The number of control curves used in the polar angle direction to construct the facet shape. Typically, several control curves are needed in order to provide enough degrees of freedom to achieve the theoretical limit of concentration performance.

$n_{inside}$—Typically a low dispersion material like BK7 having a refractive index of about 1.6. Note that the greater the refractive index $n_{inside}$ relative to $n_{outside}$ the larger the acceptance angle of a cone of light rays and also the larger the potential final concentration of light, however, the greater the mismatch in refractive indices between the surrounding air and the lens—this may increase reflection losses.

$n_{outside}$—Typically air. Together with $n_{inside}$ it determines the TIR acceptance angle, which is a critical non-imaging performance parameter. Ideally the TIR acceptance angle is greater than the light-cone that defines the edge-rays at the input aperture. Note that dirt on the lens surface will locally change this parameter and decrease the lens performance.

Focal Spot Shape—The output aperture contains a focal region and it is often desired to have a particular shape to this spot. For example, if the concentrator is focusing the light onto a square shaped photovoltaic cell then we seek to ensure that there is an uniform and square spot of light at the concentrator's focus. The requirement of a focal spot having a particular shape may significantly increase the number of degrees of freedom needed for the surface shape and therefore significantly increase the number of control curves $M_\phi$ needed for a particular design. The focal spot shape also may strongly influence the optical momentum just prior to light absorption at the focal region.

Acceptance solid-angle—this defines the input aperture's edge-ray bundles.

Exitance solid-angle—this defines the output aperture's edge-ray bundles.

N—the number of total internal bounces required for transforming input edge-rays to out-put edge-rays process. This is related to the concentrator type—for example an $I^N$ type concentrator.

Step 2: Provide an initial estimate for the lower bounding function z=g(r). The initial shape is significantly distorted as a 4-parameter set of edge rays at the input aperture are transformed to a 4-parameter of edge rays at the output aperture using analytic techniques on a 5-dimensional extended phase space or through iterative computer numerical techniques. The initial shape most often impacts convergence time for the final lens shape.

Step 3: Calculate the profile of the upper bounding profile h(r). The exact theory can be used or the approximate theory. Because the exact theory is only useful very near r=0 and because we will ultimately not need to us the resulting facets very close to the optical axis in a folded optical system let use the efficient and very accurate approximation:

$$h(r) = g(r) + \frac{r\tan(\Delta\phi)}{\left\{\tan\left[\frac{\Psi}{2}\right] + \tan(\Delta\phi)\sin\alpha\right\}\cos\alpha}, \quad (43)$$

where $$\tan\alpha = \frac{dg(r)}{dr}. \quad (44)$$

Step 4: Determine the surface of the linear facet control plane by calculating its first order Bezier parametric representation:

$$R(r,\phi) = R_0(r) + \frac{\phi}{\Delta\phi}\left[R_{M_\phi}(r) - R_0(r)\right], \quad (45)$$

where $$R_0(r) = \langle r, 0, g(r)\rangle, \quad (46)$$

and $$R_{M_\phi}(r) = \langle r\cos(\Delta\phi), r\sin(\Delta\phi), h(r)\rangle. \quad (47)$$

Note that the linear facet control plane is the most rudimentary facet structure possible and in general will have associated with it many problems that need correction. This was the problem of some of the prior art, which is overcome in this invention. In particular, the problems corrected by this procedure are astigmatism and defocusing.

Step 5: Calculate the unit normal vector function to the first order control surface. This will be used for lifting-off the perturbation contours for the new Bezier surface. In particular, $$N(r,\phi) = \frac{\nabla U(r,\phi,z)}{\|\nabla U(r,\phi,z)\|} \quad (48)$$

where $$\nabla U(r,\phi,z) = \quad (49)$$
$$\hat{x}\left(\cos\phi\frac{\partial U}{\partial r} - \frac{\sin\phi}{r}\frac{\partial U}{\partial \phi}\right) + \hat{y}\left(\sin\phi\frac{\partial U}{\partial r} + \frac{\cos\phi}{r}\frac{\partial U}{\partial \phi}\right) + \hat{z}\frac{\partial U}{\partial z}.$$

This is valid for all r≠0. At the origin simply set N(0, φ)=0.

Step 6: Calculate the perturbed control contours P(r, φ$_k$) based on curves lifted off of the first order control surface R(r, φ) at φ=φ$_k$ where k∈{0, 1, 2, . . . }.

$$P(r,\phi) = R(r,\phi) + \Lambda(r,\phi)N(r,\phi), \quad (50)$$

such that the scaling is given by an expansion excluding the values φ$_0$=0 and φ$_M$=Δφ

$$\Lambda(r,\phi) = \sum_{j=1}^{M_\phi - 1} \lambda(r,\phi_j)\delta(\phi - \phi_j). \quad (51)$$

Step 7: Numerically optimize the shape of the facet analytically in phase space or numerically via computer. The GFA and is given by $$\Psi(r) = \sum_{k=0}^{N_a} a_k r^k. \quad (52)$$

The individual scaling functions are also given as a power expansion in terms of r, so that $$\lambda(r,\phi_j) = \sum_{k=0}^{N_b} b_{j,k} r^k. \quad (53)$$

An example of 5$^{th}$ order equations containing initially unknown coefficients, which are needed for the lens design are:

$$\Psi(r) \approx a_0 + a_1 r + a_2 r^2 + a_3 r^3 + a_4 r^4 + a_5 r^5 \quad (54)$$

and $$\lambda(r,0) = 0$$

$$\lambda(r,\phi_1) \approx b_{1,0} + b_{1,1}r + b_{1,2}r^2 + b_{1,3}r^3 + b_{1,4}r^4 + b_{1,5}r^5$$

$$\lambda(r,\phi_2) \approx b_{2,0} + b_{2,1}r + b_{2,2}r^2 + b_{2,3}r^3 + b_{2,4}r^4 + b_{2,5}r^5$$

$$\lambda(r,\phi_3) \approx b_{3,0} + b_{3,1}r + b_{3,2}r^2 + b_{3,3}r^3 + b_{3,4}r^4 + b_{3,5}r^5$$

$$\lambda(r,\Delta\phi) = 0. \quad (55)$$

where λ(r, φ$_i$) scaling function are usually located at equally spaced polar angles φ$_i$=iΔφ/M$_\phi$.

The [a$_k$] and [b$_{j,k}$] coefficients represent a set of free parameters that can be optimized by numerical optimization techniques available, such as differential evolution (a genetic algorithm), Nelder Mead, or one of many other computational optimization techniques. This assumes that a suitable cost function is available that accounts for the etendue and the specific phase-space trajectories. Therefore, the problem of finding a lens that maps input edge-rays to out-put edge rays has been reduced to finding a discrete and small number of unknown coefficients. It as been found that there are many local minima so that the choice of a cost function and starting conditions is critical for fast convergence. In particular, cost functions should take the form $$C_i = C_i(a_m, b_{j,n}, c_k) \quad (56)$$

where the i$^{th}$ cost function measures a well defined parameters in phase-space and where c$_k$ are the coefficients of a Taylor expansion of the facet profile g(r) such that $$g(r) = \sum_{k=0}^{K} c_k r^k. \quad (57)$$

The rest of the discussion of this invention discloses some of the resulting concentrator designs that have evolved from this of analysis by using cost functions defined on an optical phase-space.

While the above description contains many specific details to the modeling of the non-imaging lens system, these details should not be construed as limiting the scope of the invention but as merely providing illustrations of some of the presently preferred methods. The present invention is thus not limited by the above modeling, but can be changed or modified in various ways on the basis of the general principles of the invention, and such changes or modifications are not excluded from the scope of the invention. Thus the scope of the invention should be determined by the appended claims and their legal equivalents, and not by the examples given.

BRIEF DESCRIPTION OF DRAWINGS

The foregoing discussion and other objects, features, aspects, and advantages of the present invention will become apparent from the following detailed description of embodiments and drawings of physical principles given by way of illustration.

DETAILED DESCRIPTION

Figure 3:
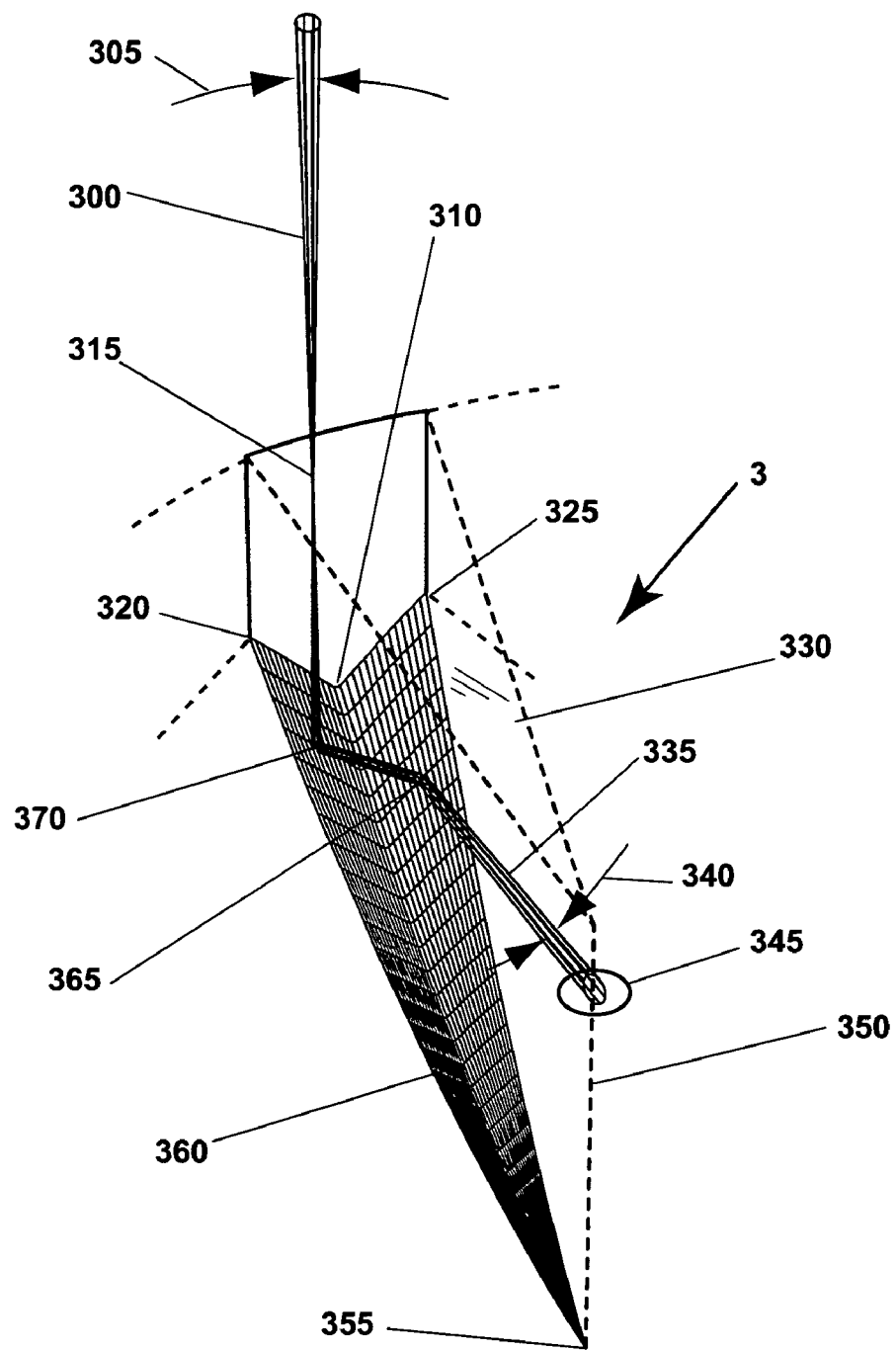
FIG. 3 shows a perspective view of a single self-resonant facet in an $I^2$ type concentrator configuration as well as a single bundle of edge rays undergoing reflections.

FIG. 3 shows a facet subcomponent of a concentrator. It is a single facet that transforms an input light-cone forming the input edge-rays 300, having an input angle 305 of angular extent $2\theta_{in}$, to an output light-cone forming output edge-rays 335, having an output angle 340 of angular extent $2\theta_{out}$. This single facet concentrator comprises a transparent top input surface 330 and a bottom transparent facet surface 360. These surfaces are part of a contiguous homogenous and transparent facet 3 having an dielectric index of refraction $n_d$ that is greater than the surrounding medium $n_a$, which is typically air. The input edge rays pass through the input aperture at the light-cone-apex 315 and emerge at the output aperture 345, which is symmetrically positioned about the optical axis 350. The pattern of light made by the input edge rays 300 is typically, but limited to, a conic section for a simple and well designed facet surface 360. The light-cone is redirected by TIR at a first facet side at a point 370, and then redirected again by TIR at a second facet surface at a second point 365. The facet surface 360 thereby providing a means for at least two redirections by TIR is self-resonant. Typically the first surface of the facet, given by the points 355, 310, 320, 355, and the second surface of the facet, given by the points 355, 310, 325, 355 are symmetric and mirrored about the lower facet apex curve 355, 310. However, in some embodiments the first facet surface and the second facet surface of the facet may not be a symmetric. This is typical when the desired focal spot region does not possess a circular symmetry and is matched to the geometry of a desired focal region. Also note that the facet surface is not planar if there is to be only one focal region 345, and if this focal region is to have a minimal area so that the optical concentration is maximized.

Figure 4:
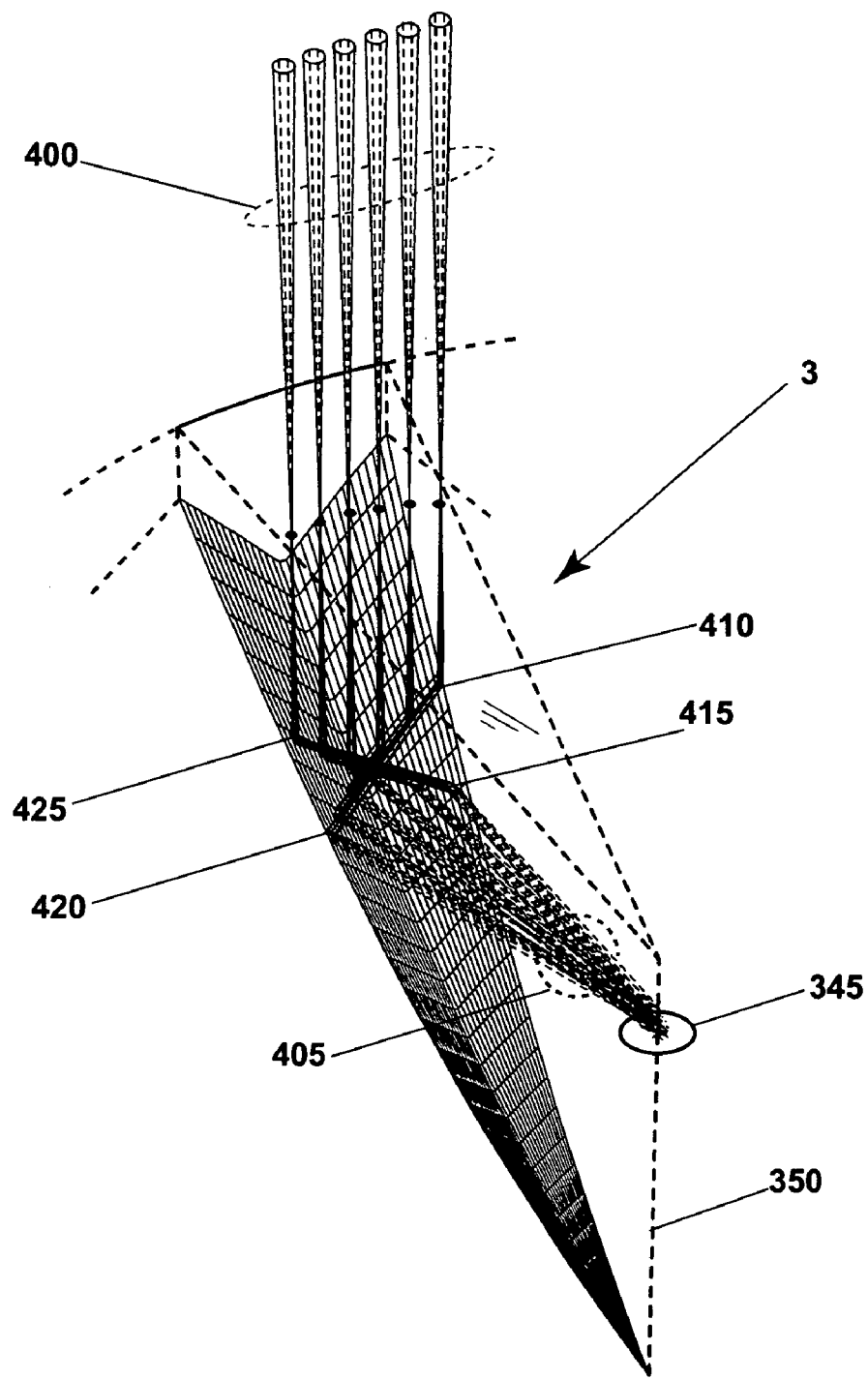
FIG. 4 shows a perspective view of a single self-resonant facet in an $I^2$ type concentrator configuration as well as several bundles of edge rays undergoing reflections.

FIG. 4 shows this same facet 3 as shown in FIG. 3, but now with a set of input edge rays 400, which have an intersection with the the top surface 330 at a constant radius. The set of input rays 400 are redirected through two redirections by TIR. The rays in the vicinity of surface region 425 being mirrored in angular coordinate to the vicinity of region 415 and the rays in the vicinity of 410 being mirrored to the vicinity of region 420 before being redirected to the common focal region 345. The momentum of the out put rays 405 being predominantly radially directed towards to optical axis 350 at the focal region 345.

Figure 5:
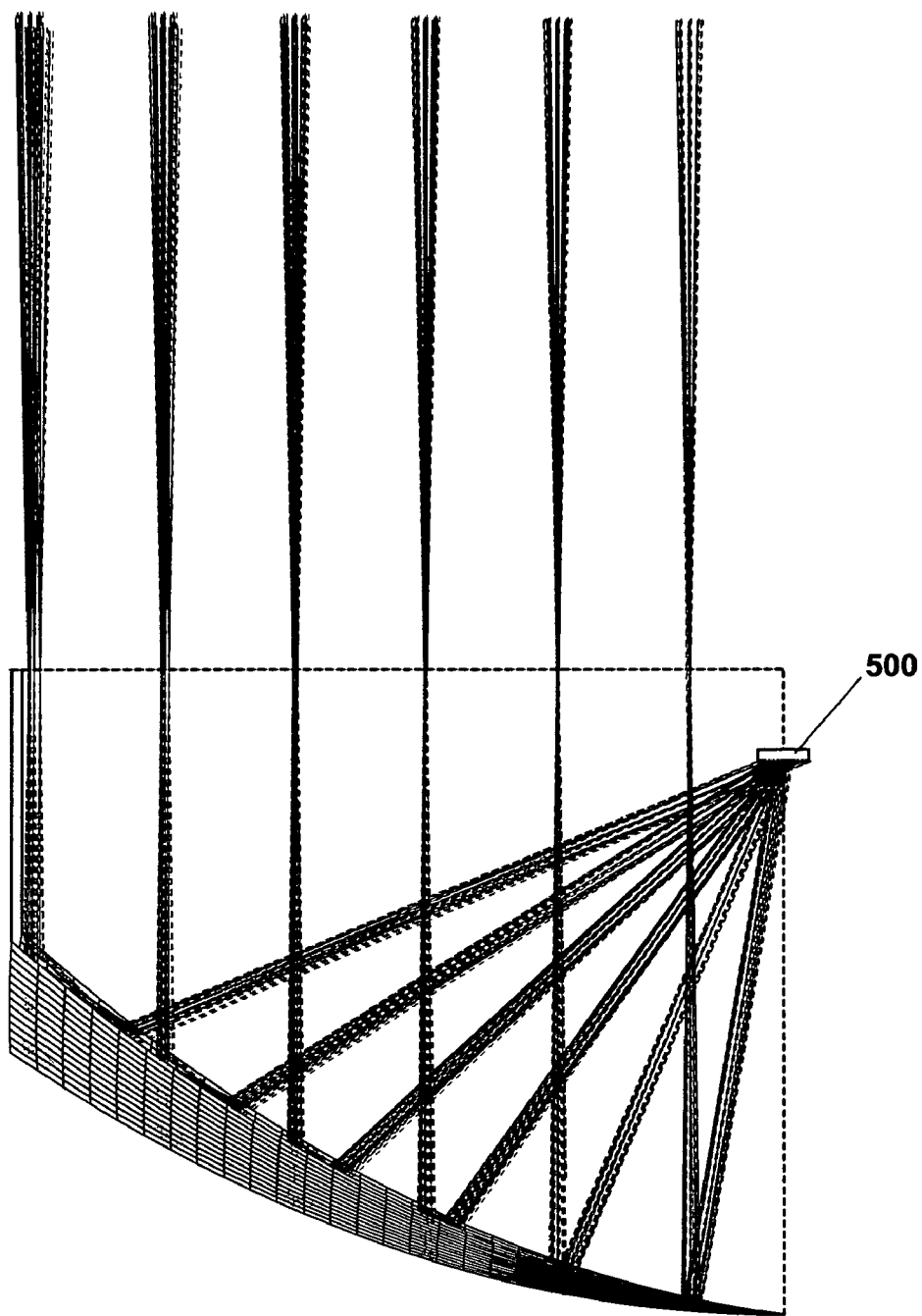
FIG. 5 shows a side view of a single self-resonant facet in a $I^2$ type concentrator configuration as well as a large set of edge rays undergoing reflections.

FIG. 5 shows this same facet system from a side perspective. The focal region now contains an energy conversion device such as a photovoltaic cell. Although the point-to-point ordering of the rays is significantly different from an imaging lens, the use of all three spatial dimensions and three momentum dimensions has provided a relatively simple and functional concentrator. A distinguishing aspect of this functionality is that the entire concentrator is transparent for rays that are incident from directions that are substantially different from the normal incident direction. This allows indirect light, such as light from diffuse scattering from a cloud, to easily pass through the concentrator structure, while direct sunlight is still concentrated to the photovoltic cell 500.

Figure 6A:
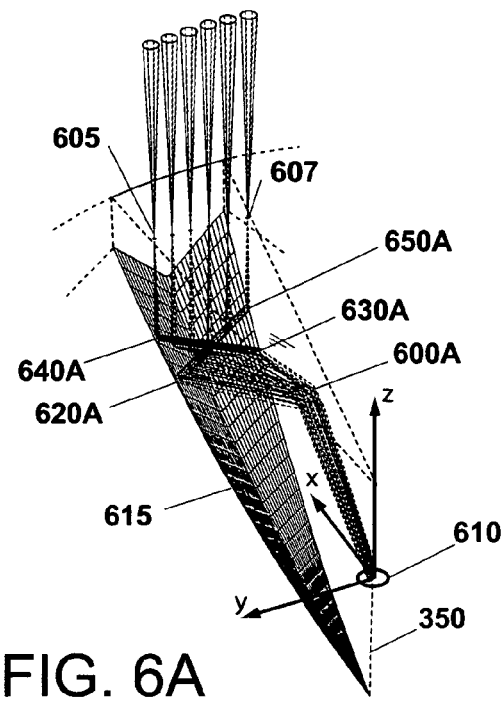
FIG. 6A shows a perspective view of a single self-resonant facet in a $I^3$ type concentrator configuration.

FIG. 6A shows a configuration that is suitable for $I^3$ type concentration. In this configuration the shape of the lower facet is changed from that shown in previous figures by using a new set of scale functions $\lambda$ to ensure that each of the set of edge rays at a certain radial distance from the optical axis 350, such as edge rays at location 400 in FIG. 4, map to a unique intermediate focus on the upper surface through two TIR redirections on the bottom facet surface 615, such as at locations 640A and 630A as well as 650A and 620A. In FIG. 6A an intermediate focal region 600A is provided at a location between the input locations 605 or 607 and the optical axis 350. At the intermediate focal location 600A a third TIR redirection occurs and this redirects the light to the final focal region 610. This final focal region may be a MFR or a BFR depending on the specific morphology of the lower facet 615. The intermediate focal location 600A is also not a fixed region on the first upper surface. Rather, as the initial input point 605 moves closer to the optical axis 350 the intermediate focal region 600A also moves closer to the optical axis 350. Furthermore, this implies that there is a limit to how close to the optical axis 350 that the input rays can strike the first surface. As the point 605 or 607 move closer to the optical axis a location is reached at which TIR will no longer be supported at the third redirection location. Other means for redirection must then be used—as is discussed in more detail later.

Figure 6B:
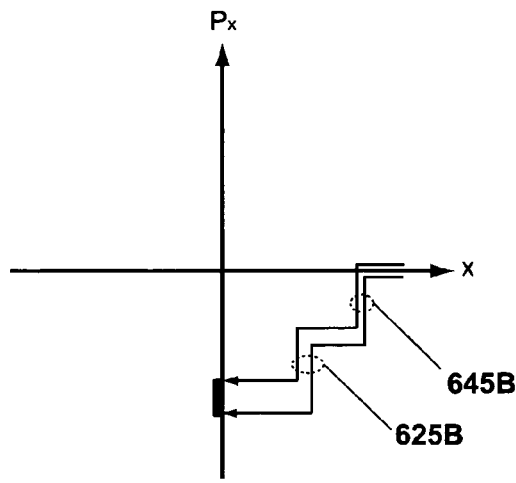
FIG. 6B shows a graph of the x-components of the coordinate and optical momentum of a ray bundle from FIG. 6A.

The design of the $I^3$ concentrator depends on the accurate specification of a cost function on an optical momentum phase-space, as described in Eq. 56 and in the following description. FIG. 6B shows a graph of the x-component of the spatial coordinate and the optical momentum, which we shall call the x-conjugate coordinate pair. Specifically, the graph shows a path on the x-conjugate coordinate pair plane that contains the phase space trajectory of two symmetric edge-ray bundles from locations 605 and 607. It may be thought of as a "corroder" within which the phase-space trajectories are contained over time.

For example, the edge-rays that enter the concentrator at location 605 on the input aperture have a first TIR redirection at the region 640A. This corresponds to the negative jump in optical momentum at 645B. Also, the edge-rays that enter the concentrator at location 607 on the input aperture have a first TIR redirection at the region 650A. This also corresponds to the negative jump in optical momentum at 645B.

It is to be understood that the different edge ray bundles will take different paths within the path defined by 645B and all of these paths are not shown for clarity of presentation. A second redirection at the facet region 630A will cause an even further negative x-directed impulse to the optical momentum at 625B. An additional second redirection at the facet region 620A will also cause an even further negative x-directed impulse to the optical momentum at 625B. The x-conjugate coordinate pair trajectories terminate when the light reaches the focal region 610, this occurs when x=0.

Figure 6C:
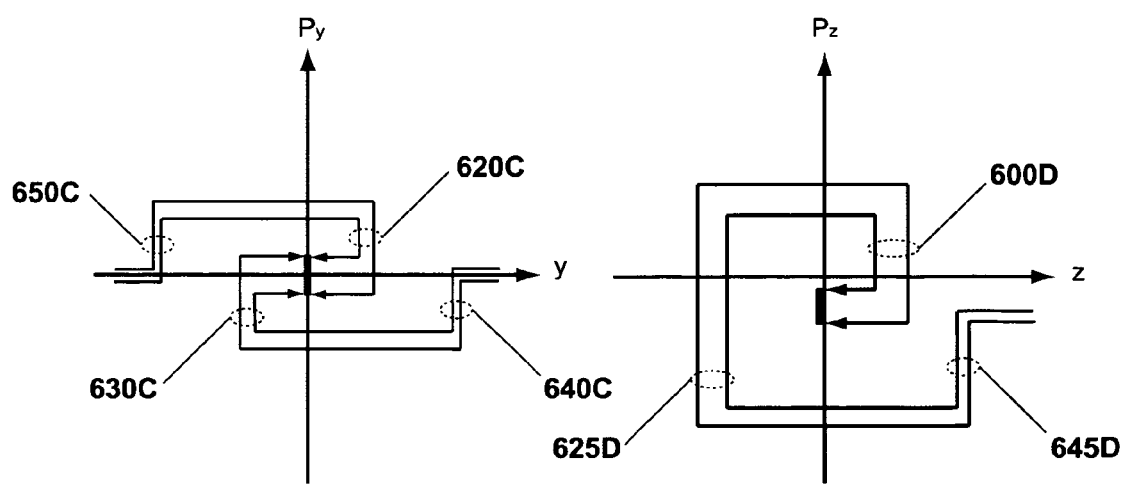
FIG. 6C shows a graph of the y-components of the coordinate and optical momentum of a ray bundle from FIG. 6A.

FIG. 6C shows the y-conjugate coordinate pair trajectory path. The positive momentum jump to the y-component of the optical momentum occurs at 650C, where the y-coordinate values are negative. The redirection is due to the TIR at 650A. The negative momentum jump to the y-component of the optical momentum occurs at 640C, where the y-coordinate values are positive. The redirection is due to the TIR at 640A. The second set of TIR redirections at regions 620A and 630A correspond to the step discontinuity of the y-component of the optical momentum at 620C and 630C respectively. The last TIR redirection at region 600A produces no change in the y-component of the optical momentum. Note that changing the input aperture surface shape will change the paths shown and they would be more complicated.

Figure 6D:
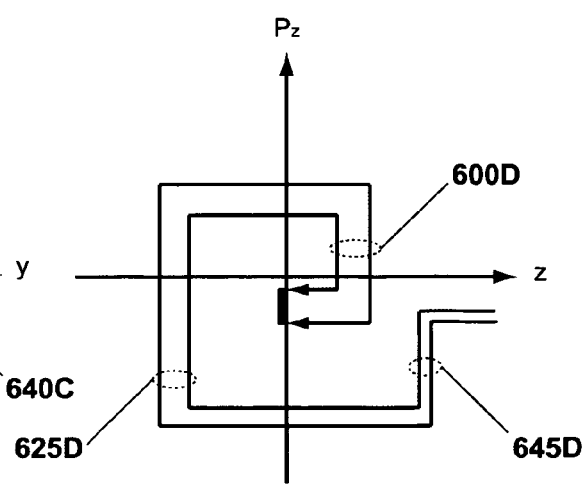
FIG. 6D shows a graph of the z-components of the coordinate and optical momentum of a ray bundle from FIG. 6A.

FIG. 6D shows the z-conjugate coordinate pair trajectory path. Both TIR redirections at regions 640A and 630A provide a negative step 645D to the z-component of the optical momentum and are contained in the path shown on z-conjugate coordinate plane. The TIR redirections at 620A and 630A provide for a significant positive step in the z-component of the of the optical momentum along the path 625D. The last TIR redirection from 600A has a corresponding optical momentum step of 600D.

In the momentum phase-space the general trajectories of at least one momentum and spatial coordinate pair are observed to spiral towards an a common locus as time evolves. The greater the concentrator type order N for systems having $I^N$ as part of the optical process then the greater the number of segments of the spiraling phase space trajectories that cover $2\pi$ radians of spiraling.

Figure 1:
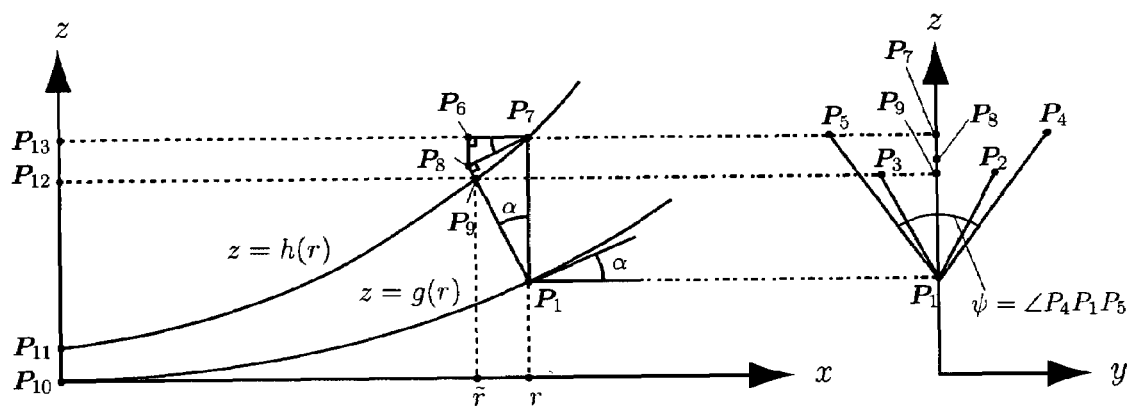
FIG. 1 shows a side and anterior view of a single facet labeled with the mathematical details of the geometry.
Figure 2:
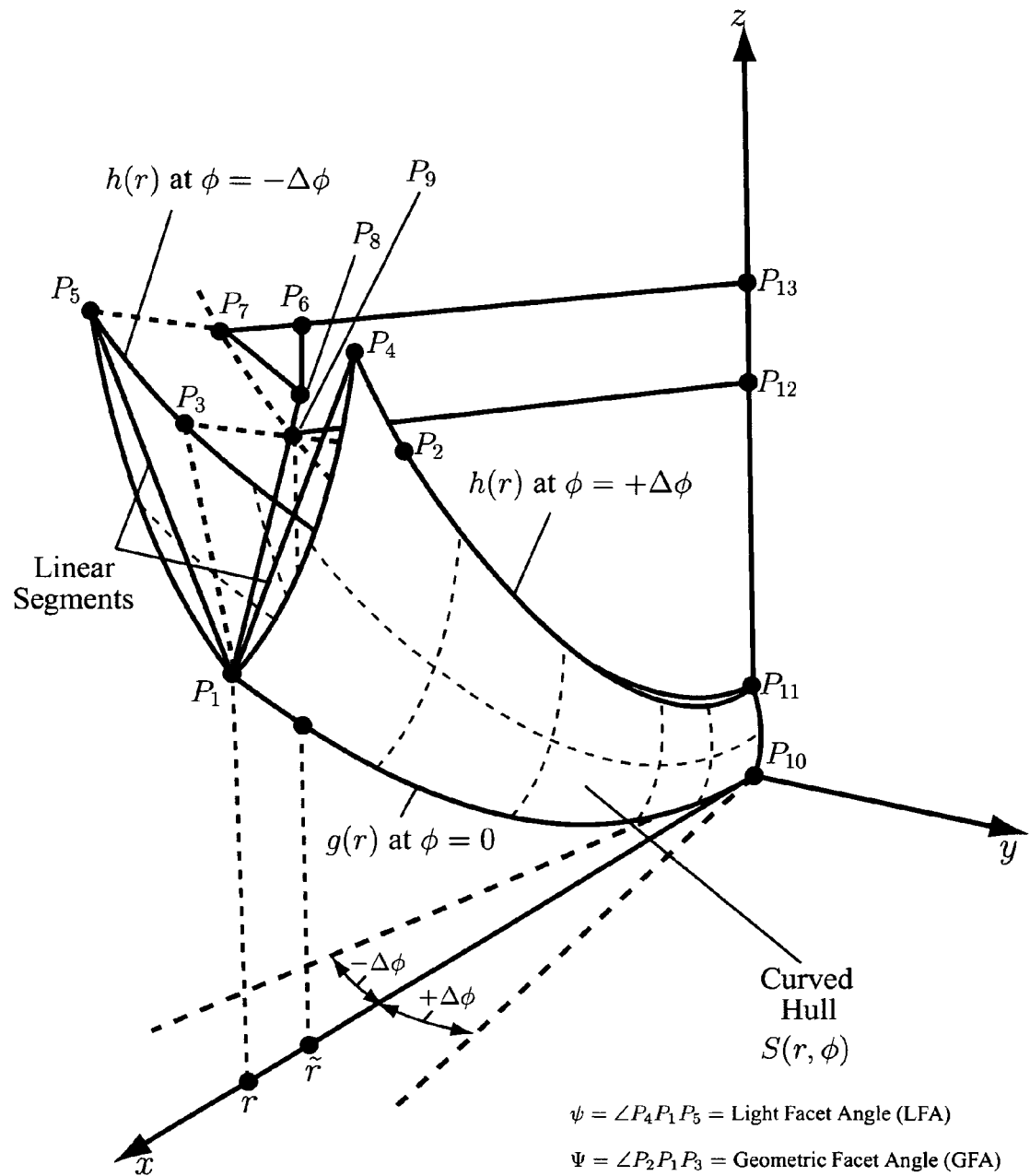
FIG. 2 shows a perspective view of a single facet labeled with the mathematical details of the geometry.
Figure 7:
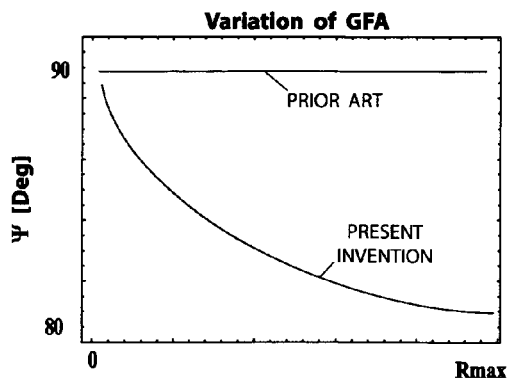
FIG. 7 shows a graphical comparison between the geometric facet angle as a function of distance from the optical axis for a typical embodiment of the present invention.

FIG. 7 shows the variation of the GFA as a function of the radial distance from the optical axis. The GFA is defined pictorially in FIG. 2. The prior art of U.S. Pat. No. 4,120,565 corresponds to the constant 90 degree GFA, while the present invention shows that a variation in the GFA is needed to reduce or eliminate astigmatism. FIG. 7 shows about a 10 degree variation in the GFA, however, this is only representative not meant to restrict the range of values taken by the GFA.

Figure 8:
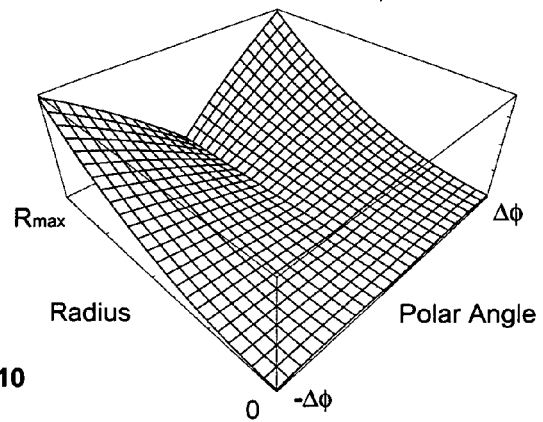
FIG. 8 shows a graphical representation of the difference between the z-coordinates of a planar facet and a typical embodiment of the present invention.
Figure 9:
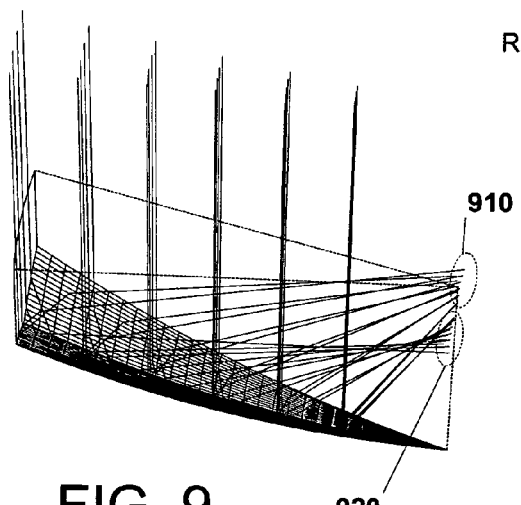
FIG. 9. shows an example of astigmatism found in prior art using an $I^2$ type concentrator configuration that is based on planar surfaces and a constant 90-degree Geometric Facet Angle.
Figure 10:
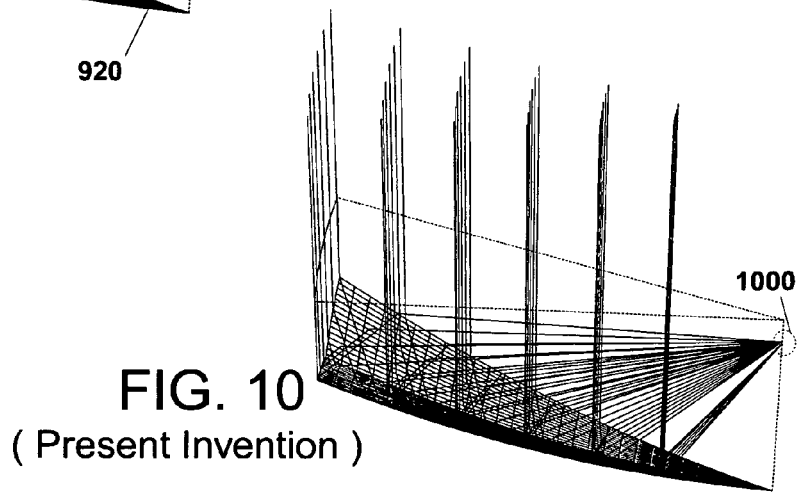
FIG. 10. shows the removal of astigmatism in an $I^2$ type concentrator configuration by using both a continuously varying Geometric Facet Angle and non-planar facet surface.

FIG. 8 shows the relative difference between the a planar surface given by Eq. 1 and the surface used to represent a well focused $I^2$ concentrator. The use of a varying GFA and a varying surface morphology convert the astigmatic and blurred focal regions 910 and 920 of FIG. 9 into a single well defined focal point 1000 for input rays that are parallel to the optical axis—as shown in FIG. 10. For edge rays the focus point becomes a focus spot and this spot or region can be made to approach the theoretical limit of concentration predicated by thermodynamics for certain embodiments.

Figure 11A:
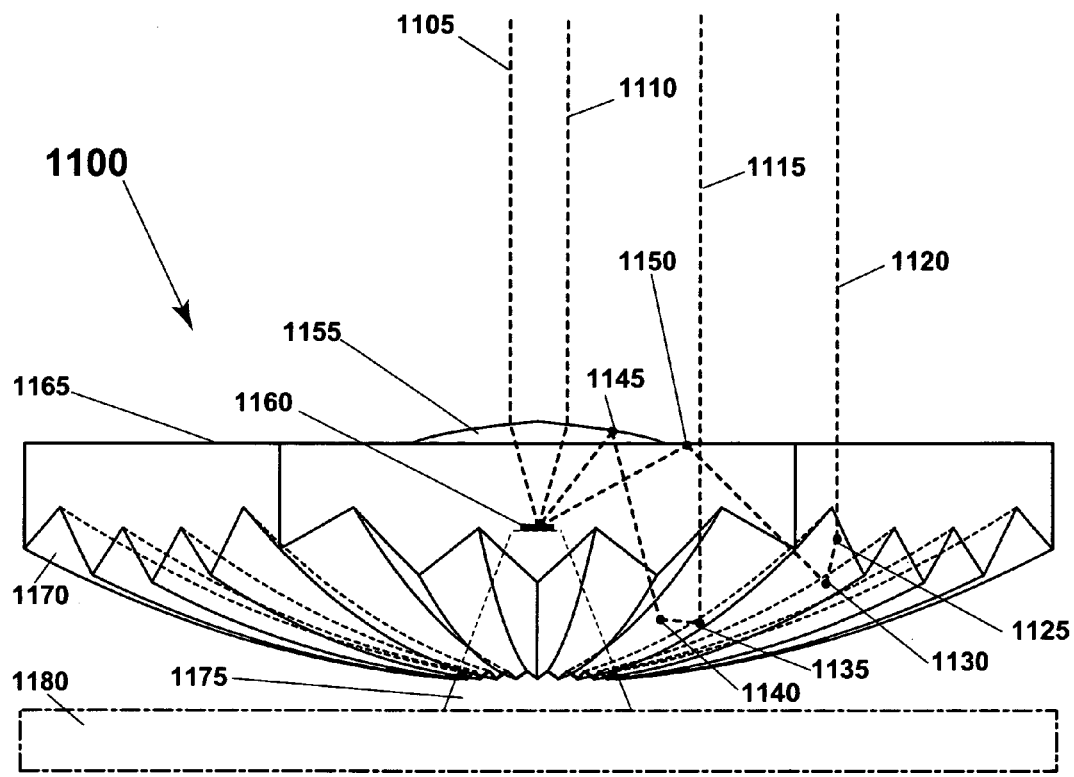
FIG. 11A shows a side view of a concentrator providing an $I^3$ type concentrator configuration for Middle Focal Regions (MFR).

FIG. 11A shows a side view of a predominantly $I^3$ type concentrator 1100 with two distinctly different modes for producing the third redirection by TIR. A light ray 1120, which is incident on a first surface 1165, is passed essentially undeviate through the optical boundary of the first surface 1165 and into the homogenous transparent medium of the non-imaging lens. The light then is redirected by TIR first at point 1125, then at point 1130, on the complimentary facet surface, and finally at a point 1150 as it propagates towards the focal region 1160. The focal region typically contains an energy conversion device, such as but not limited to, a photovoltaic chip. Point 1150 is located on the first surface 1165 and the points 1125 and 1130 are located on the second surface 1170. The second surface 1170 is comprised of a plurality of facets, which make up the second surface and which further provides a discontinuous second derivative at a finite number of radial line projecting form the optical axis of the device.

FIG. 11A also shows a second ray 1115. Again this ray passes through the first surface 1165 of the concentrator undeviate. It then is redirected twice by TIR at the self-resonant facet surface 1170. The deviations occur at points 1135 and 1140. However, the resulting ray is not properly oriented with respect to the first surface 1165 to allow a process of TIR to proceed. Therefore, a third surface 1165, having a different surface morphology than the first surface 1165, is used to redirect the ray by a process of TIR at point 1145 towards the focal region 1160. Note that the first surface 1165 is planar and the third surface 1155 is convex above the first surface 1165. The third surface 1155 is contiguous with the first surface 1165, however, on the curve of intersection between the first and second surface there does not necessarily have to exist a continuous first or second derivative—although this is the preferred embodiment in order to make manufacturing as easy as possible. Finally, rays of light, such as 1105 and 1110, which are close to the optical axis, are refracted to the focal region 1160. It should also be noted that the third surface 1155 may take the form of a faceted Fresnel lens structure having one or more annular faceted ring structures to replace the one convex third surface 1155.

The focal region shown in FIG. 11A is a MFR. However, by appropriate curvature of the active surfaces 1170 and 1155 the focal region may be moved closer to the bottom of the lens providing a BFR type lens. Note that an optional support post 1175 is available for the purpose of providing: mechanical support for the lens, mechanical support to an energy conversion device like a photovoltaic cell, an outlet for excess thermal energy to conduct towards an external heat-sink and platform 1180, and a means to bring electrical or other connections into and out of the lens structure for the purpose to conveying energy. The optional support post may be purely cylindrical or a truncated cone or any number of similar homeomorphisms.

Figure 11B:
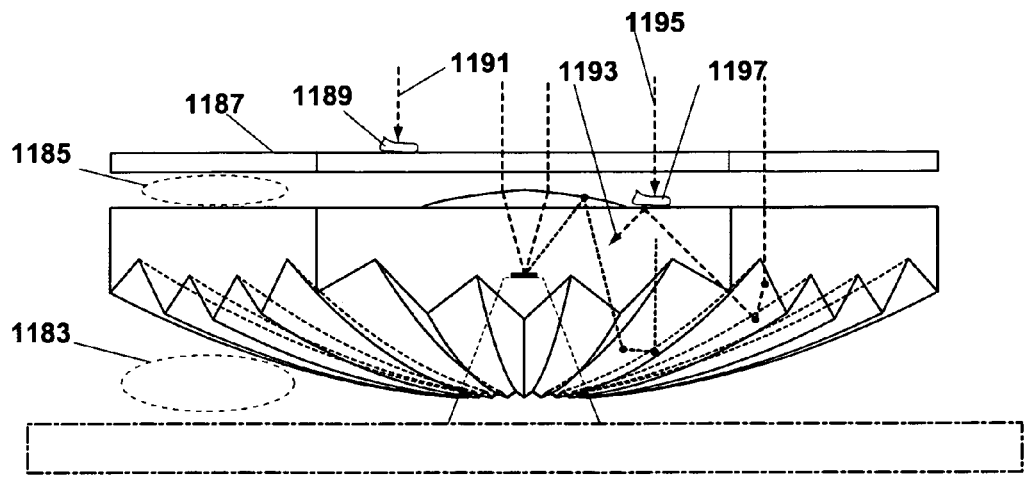
FIG. 11B shows a perspective view of a concentrator providing a predominantly $I^3$ type concentrator configuration for TFR and having Protected TIR (PTIR) for both the upper and lower surfaces of the concentrator.
Figure 12:
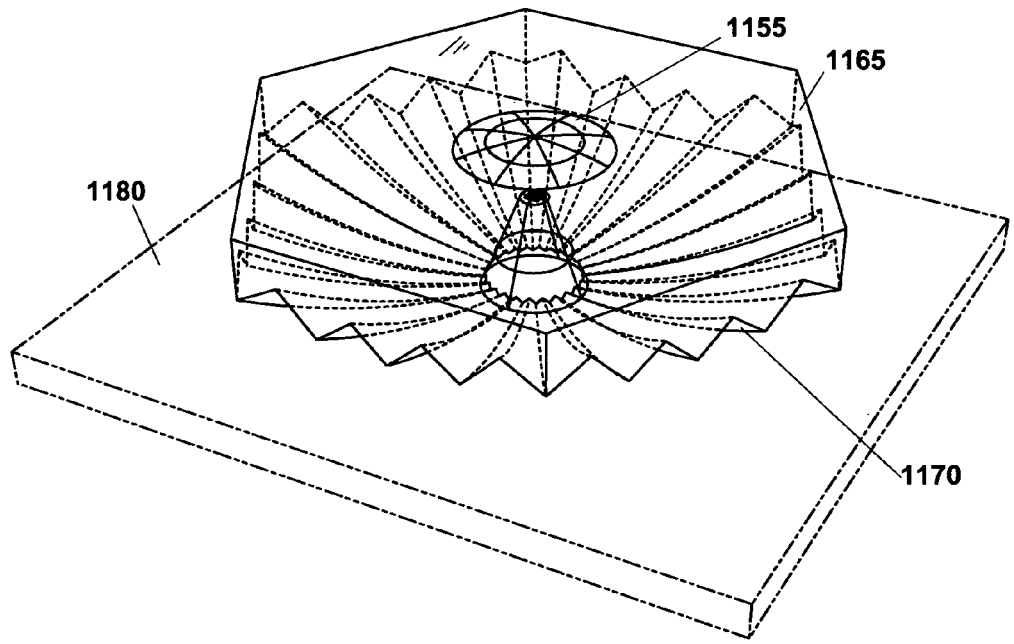
FIG. 12 shows a side view of a concentrator providing a predominantly $I^3$ type concentrator configuration for TFR and having PTIR for both the upper and lower surfaces of the concentrator.
Figure 19:
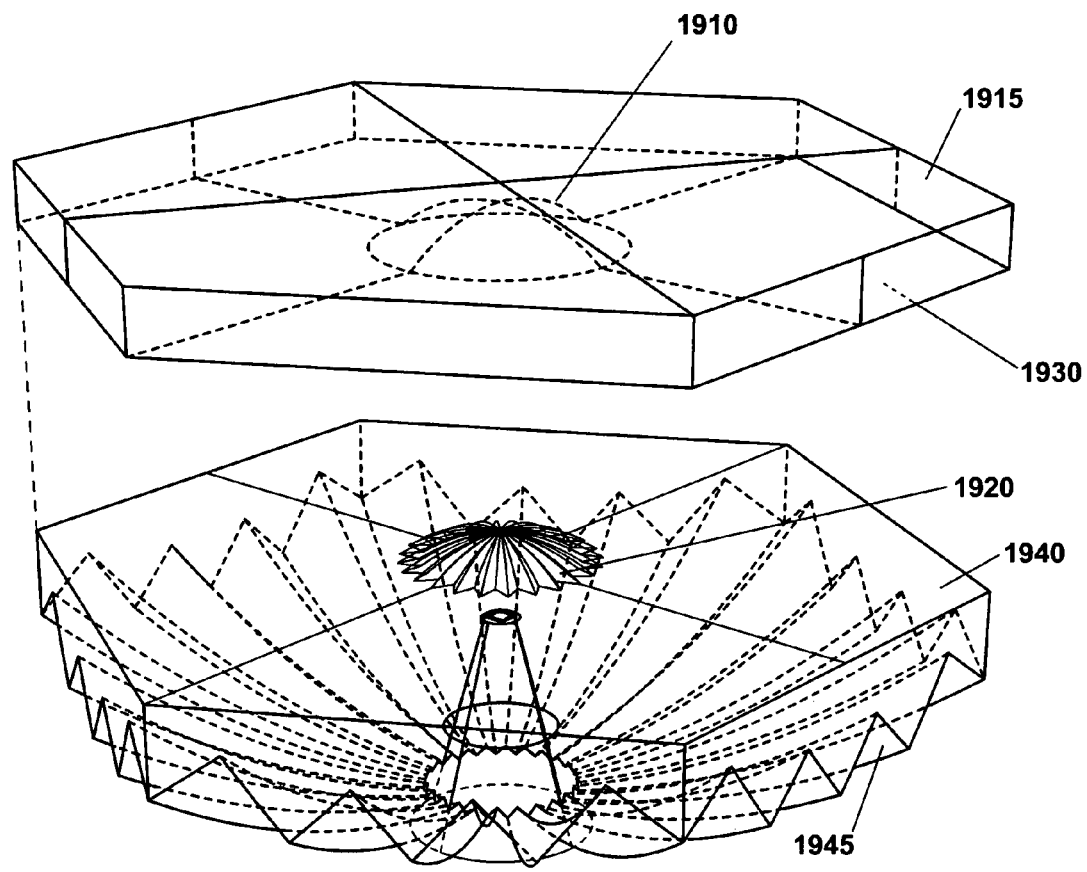
FIG. 19 shows a perspective view of a concentrator providing a predominantly $I^3$ type concentrator configuration with a PTIR secondary sub-reflector providing $I^4$ type concentration for rays close to the optical axis.

FIG. 11B shows the same $I^3$ concentrator configuration shown in FIG. 11A except that a transparent cover 1187 is placed over the concentrator to provide an air gap 1185 above the lens. The cover 1187 provides a means to keep dirt 1189 form touching the first surface 1165 of the concentrator lens thereby protecting the process of TIR. This is called Protected TIR (PTIR) and it may be critical in some applications. If the lens did not have the cover dirt 1197 could touch the upper surface and disrupt two rays, 1193 and 1195, instead of one ray, such as 1191, from getting to the focal region. Also note that by design the lower region 1183, between the lens and the external base, is also a PTIR region. There are many variants of the cover on the upper surface to form a PTIR environment. For example FIG. 19 shows a centrally located cavity that covers a sub-reflector that uses PTIR for light redirection. While such a configuration protects the central sub-reflector it does not in general protect the upper surface. The different design possibilities provide a means to form a cavity around a sub-reflector to protect the TIR. FIG. 12 shows a perspective view of UTIR version of the concentrator in FIGS. 11A and 11B.

Figure 13:
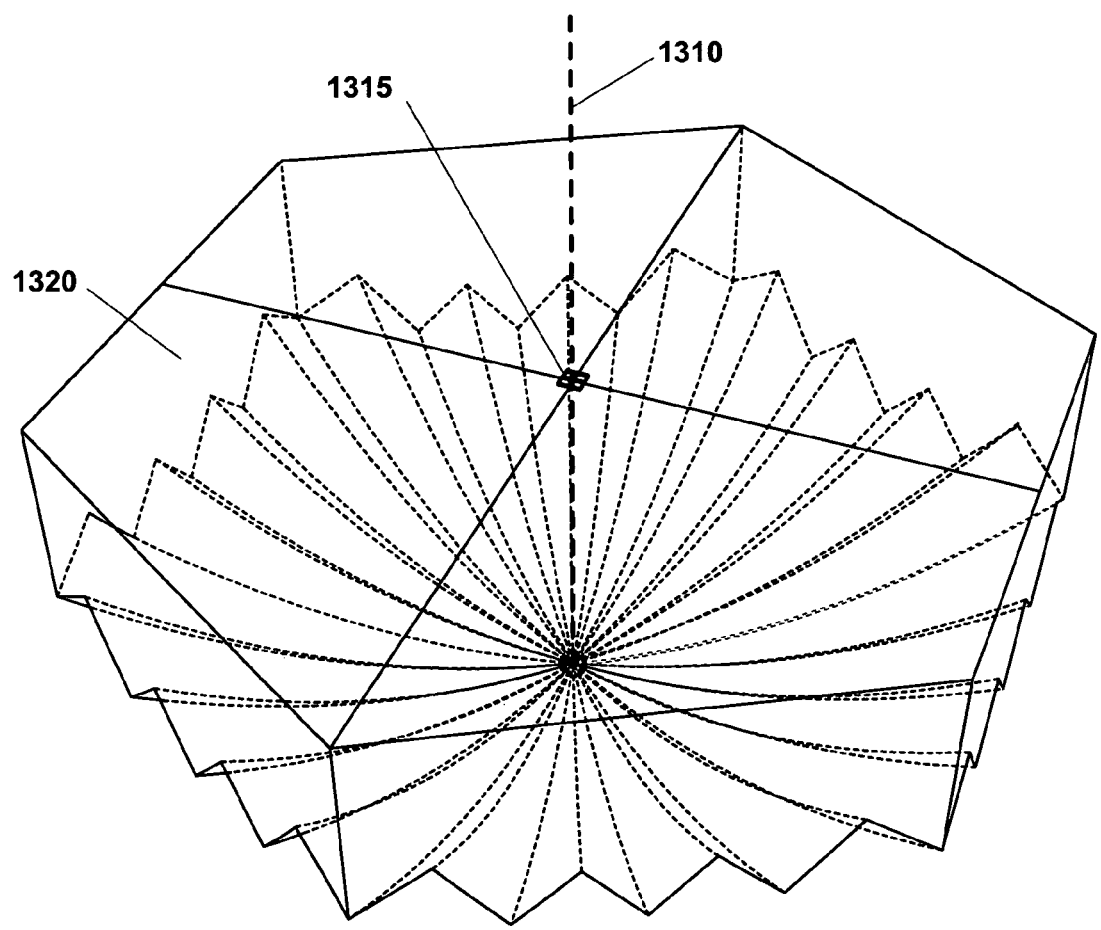
FIG. 13 shows a perspective view of a concentrator providing an $I^2$ type concentrator configuration for MFR applications.

FIG. 13 shows an $I^2$ type concentrator. An energy conversion device 1315 is located at the intersection of the first surface 1320 and the optical axis 1310. This configuration has the advantage of being less complicated than some of the other embodiments that are shown in this present invention. If the energy conversion device is a photovoltaic chip then there will need to be thin transparent electrical conductors; such as but not limited to Indium Tin Oxide, Zinc Tin Oxide, or conductive carbon nanotubes; placed on or just below the first surface 1320. Additionally, because the material used for a concentrator is typically glass or plastic, which has low thermal conductivity, there is a need to incorporate a thin layer of highly conductive material to dissipate any excess thermal loads at the energy conversion device 1315.

FIGS. 14A, 14B, 15A, 15B, 16, 17, and 18 are all different embodiments of a common theme, which has already been discussed. These embodiments show slight variations on the basic ideas presented thus far, especially with respect to the sub-reflector found around the optical axis near the upper surface (first surface) of the concentrator. Only the distinguishing features are now mentioned; the elements common the previous discussion are assumed to be included by default.

Figure 14A:
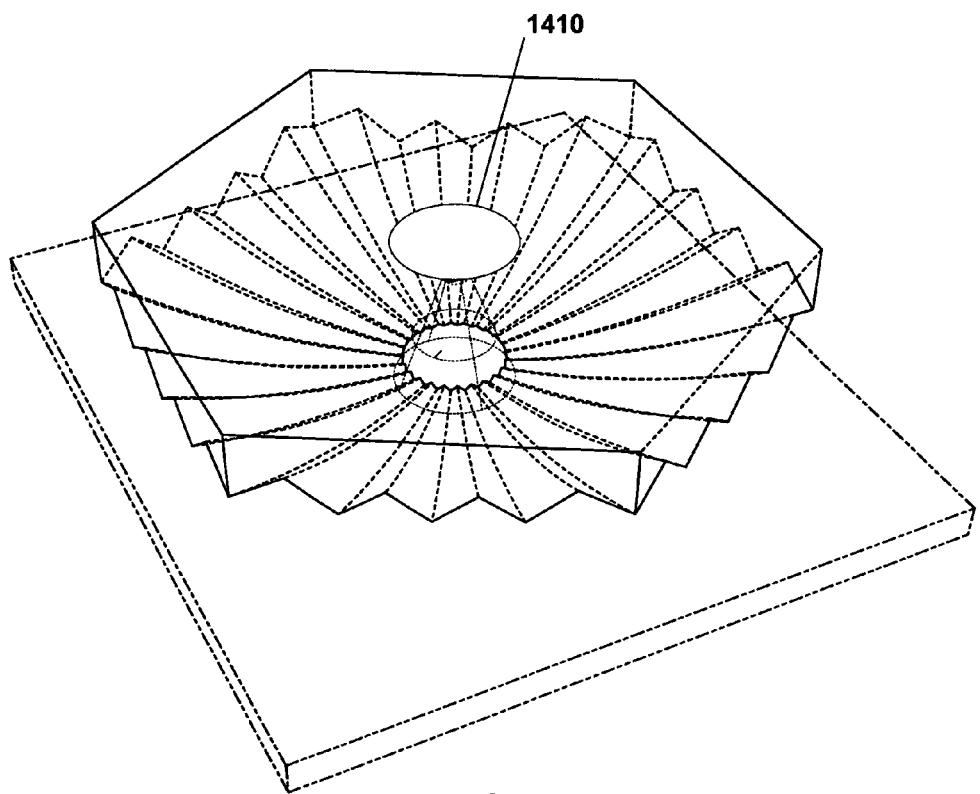
FIG. 14A shows a perspective view of a concentrator providing a predominantly $I^3$ type concentrator configuration using a planar input aperture and a secondary sub-reflector based on a central mirror surface.
Figure 14B:
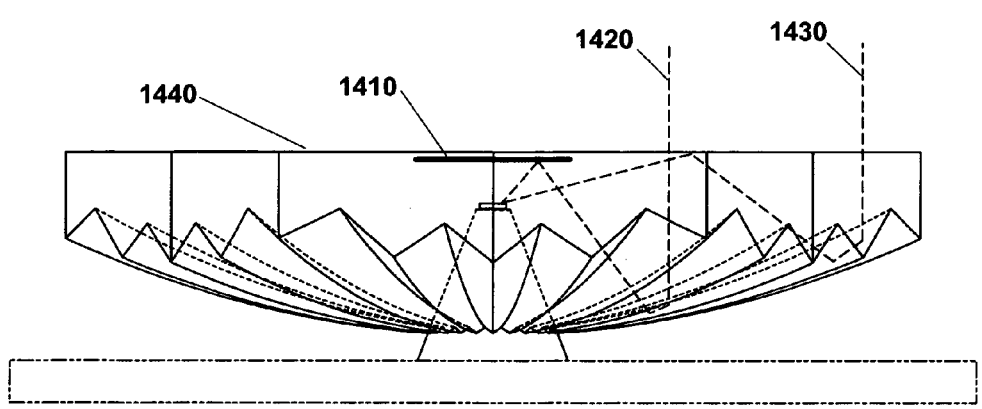
FIG. 14B shows a side view of a concentrator providing a predominantly $I^3$ type concentrator configuration using a planar input aperture and a secondary sub-reflector based on a central mirror surface.

In particular, FIG. 14A shows an $I^3$ type concentrator, which uses a very slightly curved mirror 1410 near the optical axis. This is possible because the majority of the rays are redirected to the focal region by means of TIR from a first planar surface and a second facet surface, as has already been described. FIG. 14B shows a perspective view of this embodiment. The important point to take away from these two figures is that a relatively flat mirror 1410 can redirect rays like 1420 which are closer to the optical axis, while rays 1430 that are further away from the optical axis can still use all three TIR redirections. Because of the flat first surface 1440 the mirror 1410 is relatively large in spatial extent.

Figure 15A:
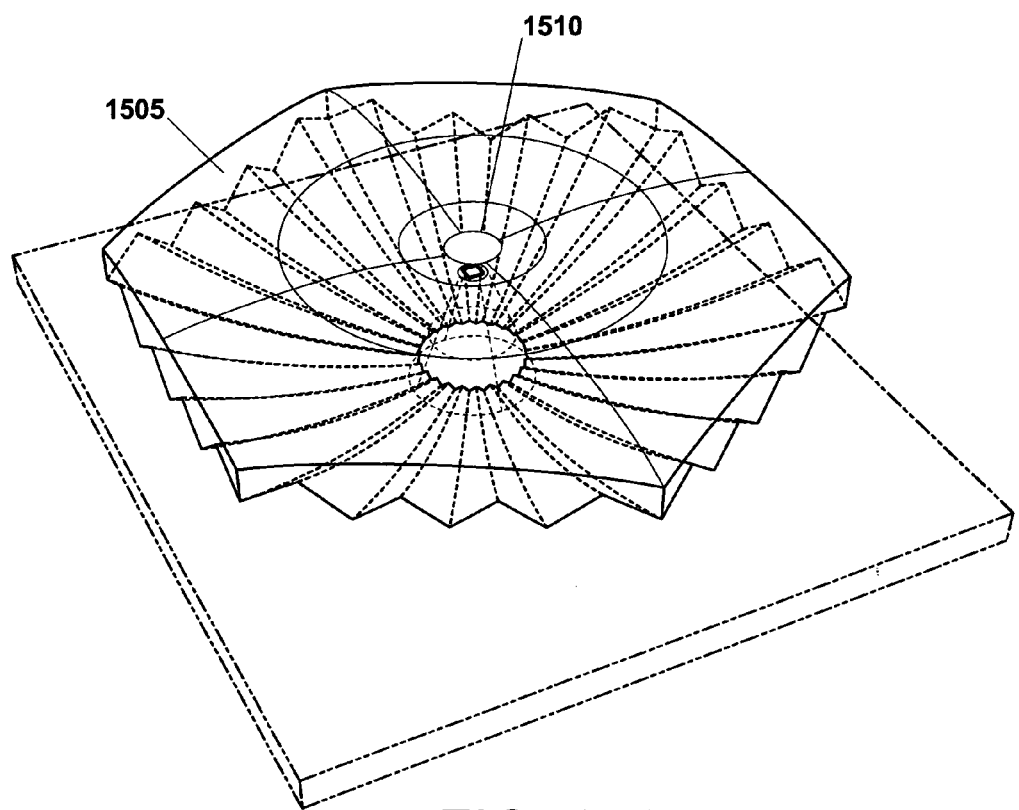
FIG. 15A shows a perspective view of a concentrator providing a predominantly $RI^3$ type concentrator configuration using a curved input aperture and a secondary sub-reflector based on a central mirror surface.
Figure 15B:
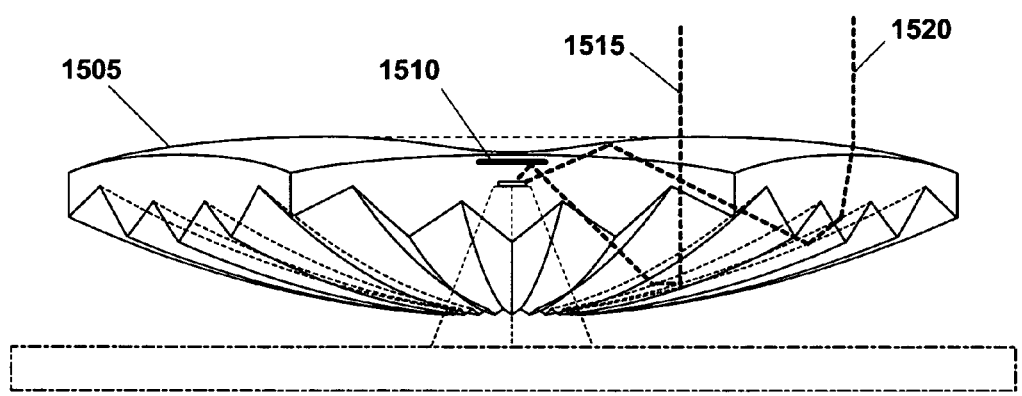
FIG. 15B shows a side view of a concentrator providing a predominantly $RI^3$ type concentrator configuration using a curved input aperture and a secondary sub-reflector based on a central mirror surface.

FIG. 15A shows a method to reduce the spatial extent of mirror 1410 of FIGS. 14A and 14B by providing a curved first surface 1505 as shown in FIGS. 15A and 15B. A ray 1520 that is far away from the optical axis is redirected according to an $RI^3$ type concentration system. While a closer in ray 1515 now is redirected according to a $RI^2X$ type concentration system.

Figure 16:
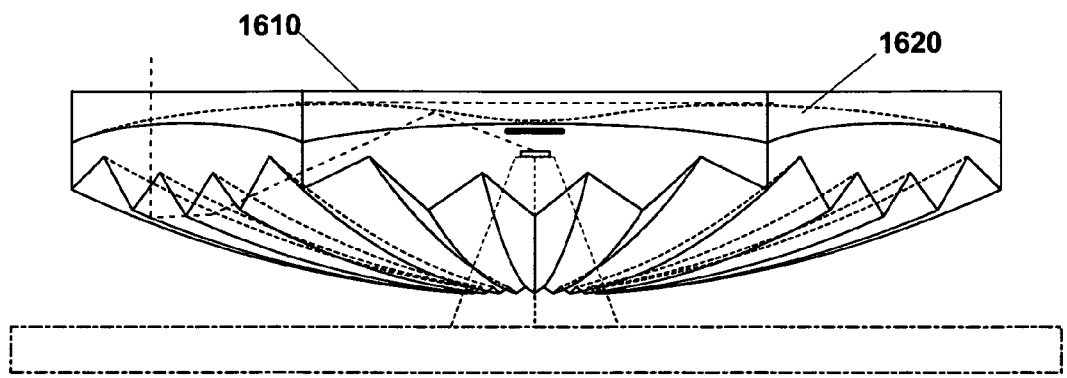
FIG. 16 shows a side view of a concentrator providing a predominantly $RI^3$ type concentrator configuration using a flat input aperture, and second refractive index region, and a secondary sub-reflector based on a central mirror surface.
Figure 17:
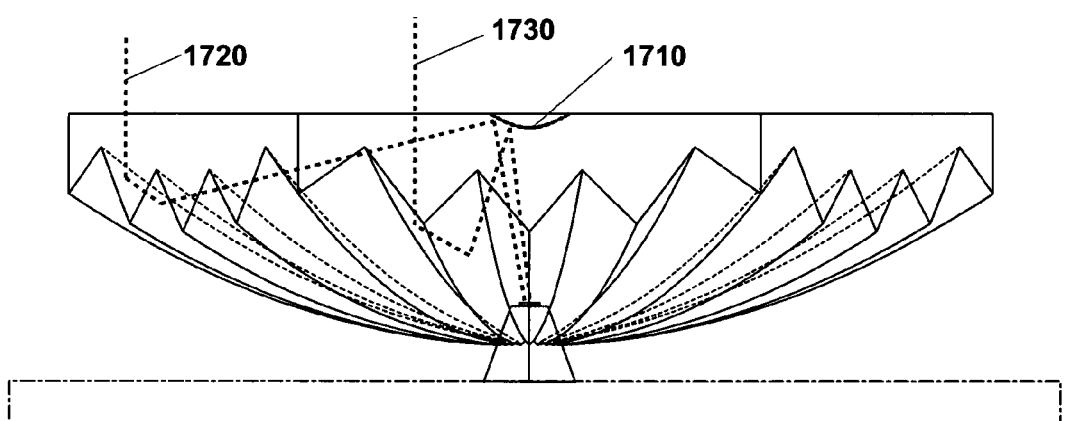
FIG. 17 shows a side view of a BFR concentrator providing a $I^2X$ type concentrator configuration using a planar input aperture and a secondary sub-reflector based on a central mirror surface.
Figure 18:
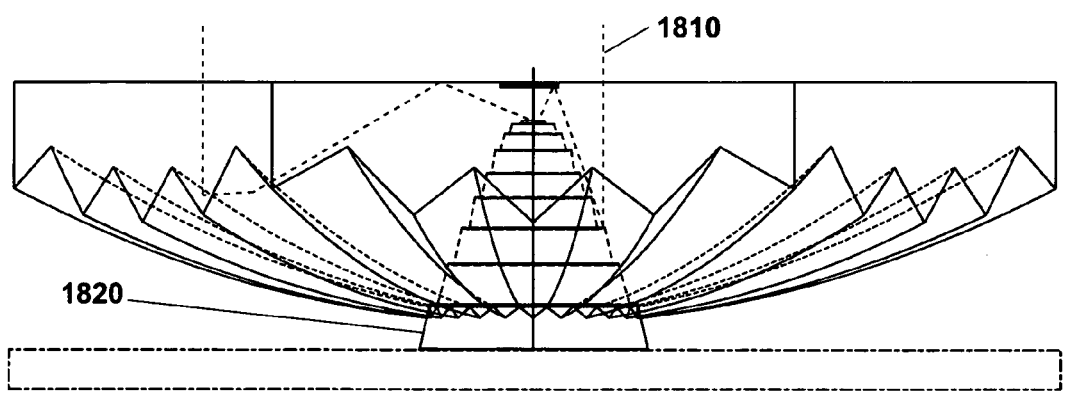
FIG. 18 shows a side view of a concentrator providing a $I^3$ type concentrator configuration using a corrugated support structure that improves the total light gathered.

FIG. 16 shows a $RI^3$ type concentrator with a flat first surface 1610 and a curved intermediate surface 1620. The refractive index of the medial between 1610 and 1620 is different than the refractive index of the medium below the intermediate surface 1620. FIG. 17 shows an $I^2X$ Type concentrator. All rays, such as 1720 and 1730, are redirected initially by two TIR deflections to a curved secondary mirror 1710. Typically, the sub-mirror 1710 would provide a perturbation of a standard hyperboloid of revolution, so that the focal region is matched to the TIR redirections from the lens facets. FIG. 18 shows a lens with a stepped mirrored support structure 1820, which allows the support structure to also contribute to the concentration process. This type of concentrator is predominantly an $I^3$ or $I^2$ type concentrator, but it has a subordinate $I^2X$ or $X^2$ function for concentration of rays near the optical axis.

FIG. 19 shows an exploded assembly drawing in perspective view of an $I^3$ or $I^4$ type concentrator. The specific type shown is based on how the primary facet surface 1915 is designed to redirect the input light. If all the input rays are directed towards the facet-based sub-reflector 1920 then the system is an $I^4$ type concentrator because there are two TIR redirections on the primary reflecting surface 1945 and two TIR based redirections on the sub-reflector facet-based surface 1920. If the rays use the first surface 1915 for a TIR on the third ray redirection, as described in FIG. 6A, then the concentrator is an $I^3$ type concentrator. The sub-reflector 1920 is always surrounded by a medium with a lower refractive index than the material that makes up the lens. For example it might be air. Furthermore, the air is trapped in the cavity formed by the concave surface 1910. This forms a PTIR system for the sub-reflector 1920. The two halves shown in FIG. 19 are in practice fused into one structure to for the concentrating lens.

Figure 20:
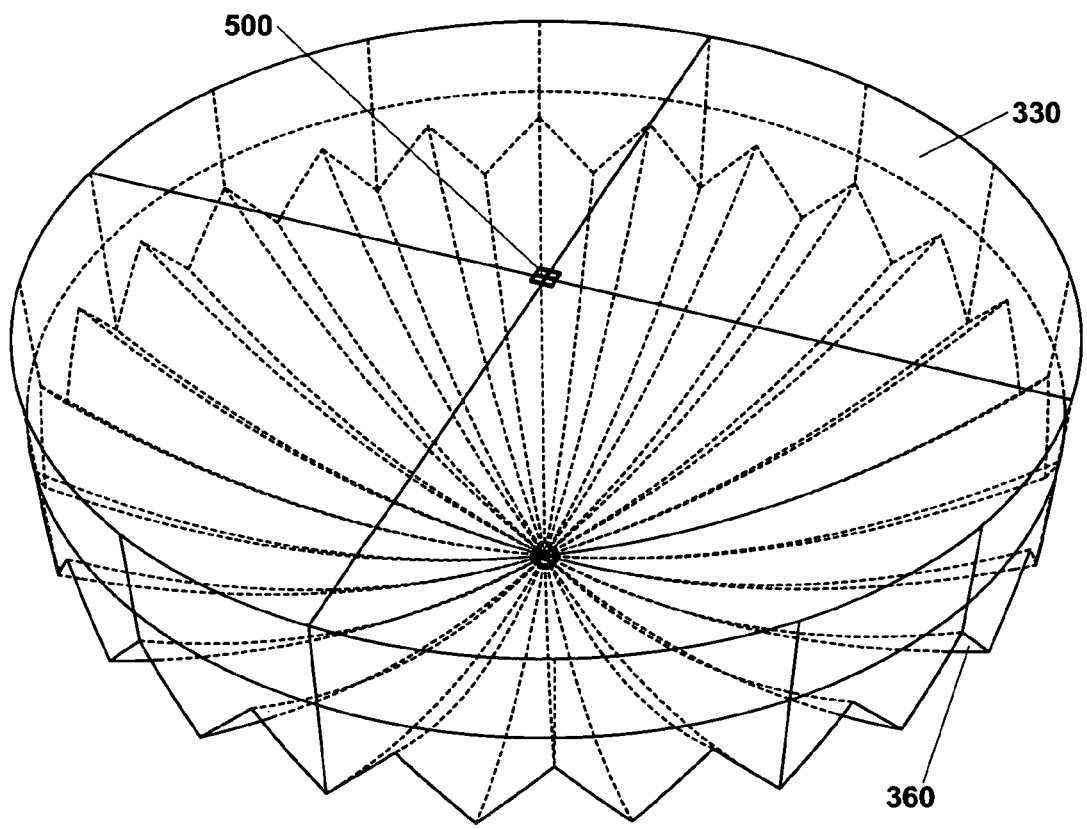
FIG. 20 shows a perspective view of a cylindrical embodiment of a concentrator providing a predominantly $I^2$ type concentrator configuration for TFR applications.
Figure 21:
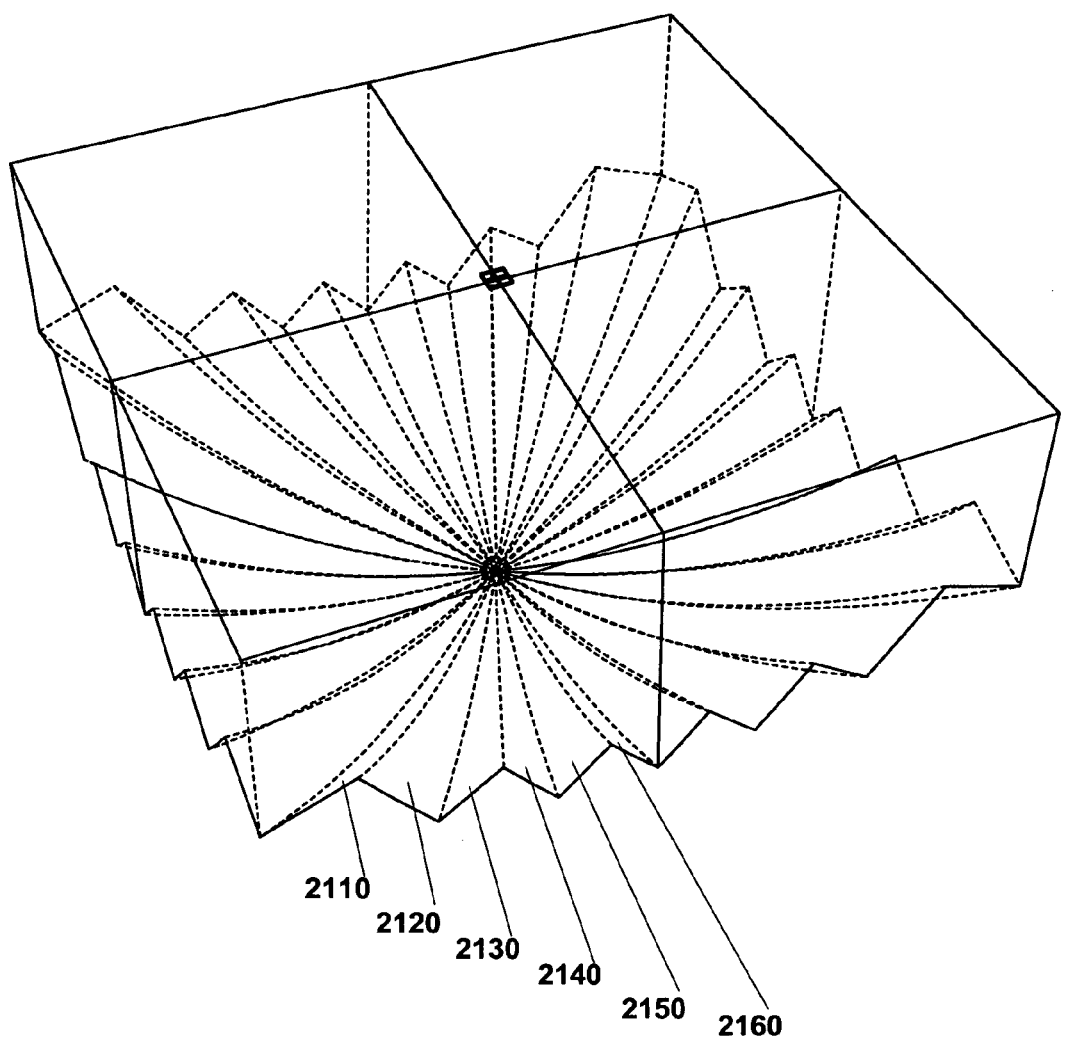
FIG. 21 shows a perspective view of a rectangular embodiment of a concentrator providing a predominantly $I^2$ type concentrator configuration for TFR applications.

FIG. 20 shows a facet-based concentrator which has cylindrical symmetry. It may have any of the features that are mentioned in the present invention. FIG. 21 shows a facet-based concentrator which has rectangular symmetry. It may have any of the features that are mentioned in the present invention.

Figure 22A:
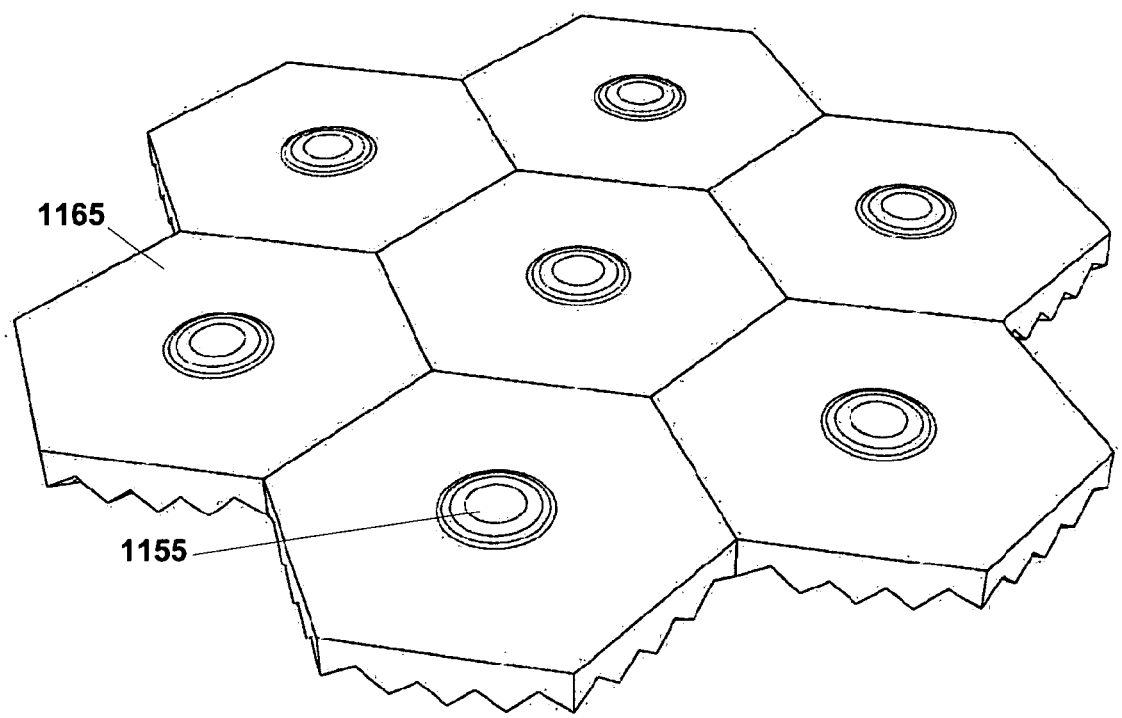
FIG. 22A shows a top side perspective view of an array of hexagonal facet based concentrators.
Figure 22B:
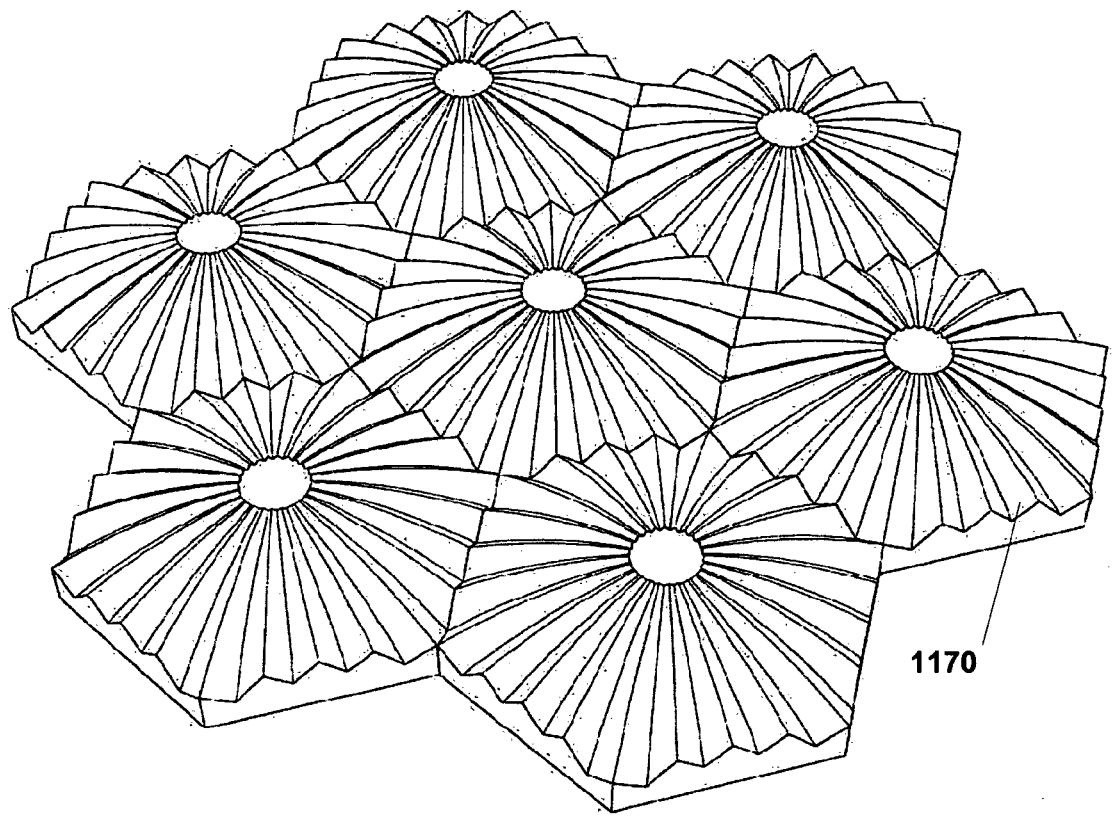
FIG. 22B shows a bottom side perspective view of an array of hexagonal facet based concentrators.
Figure 23A:
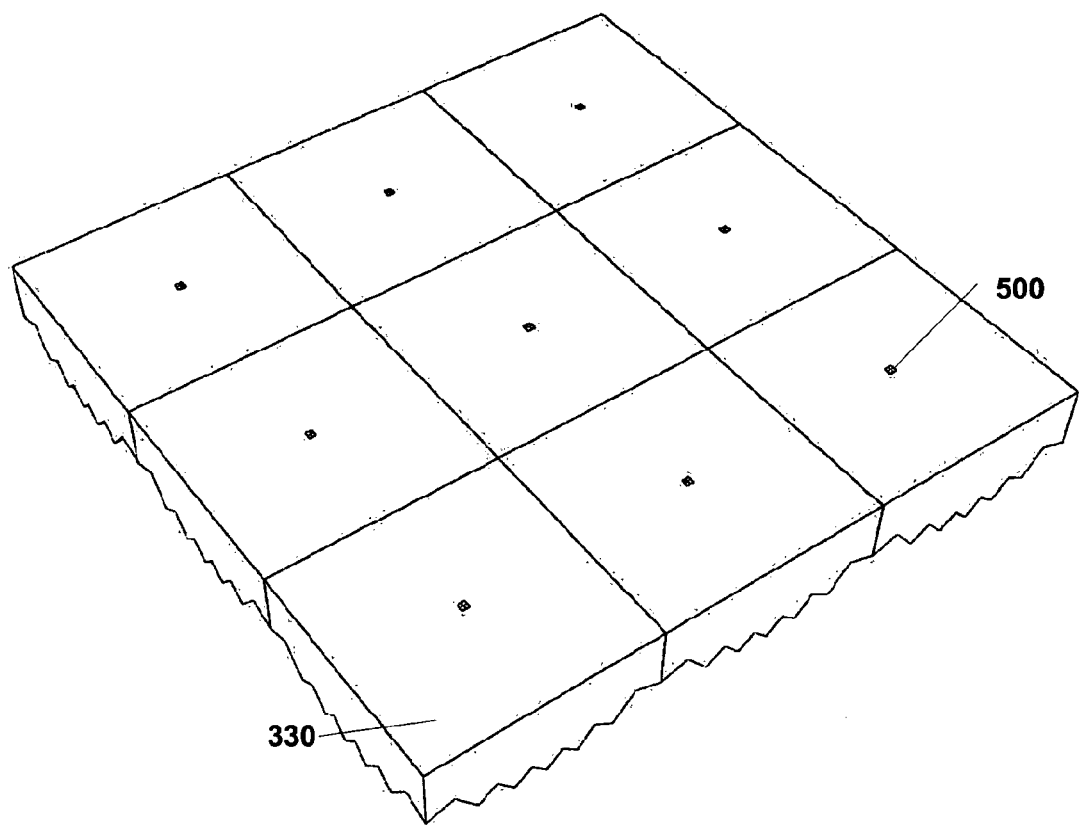
FIG. 23A shows a top side perspective view of an array of rectangular facet based concentrators.
Figure 23B:
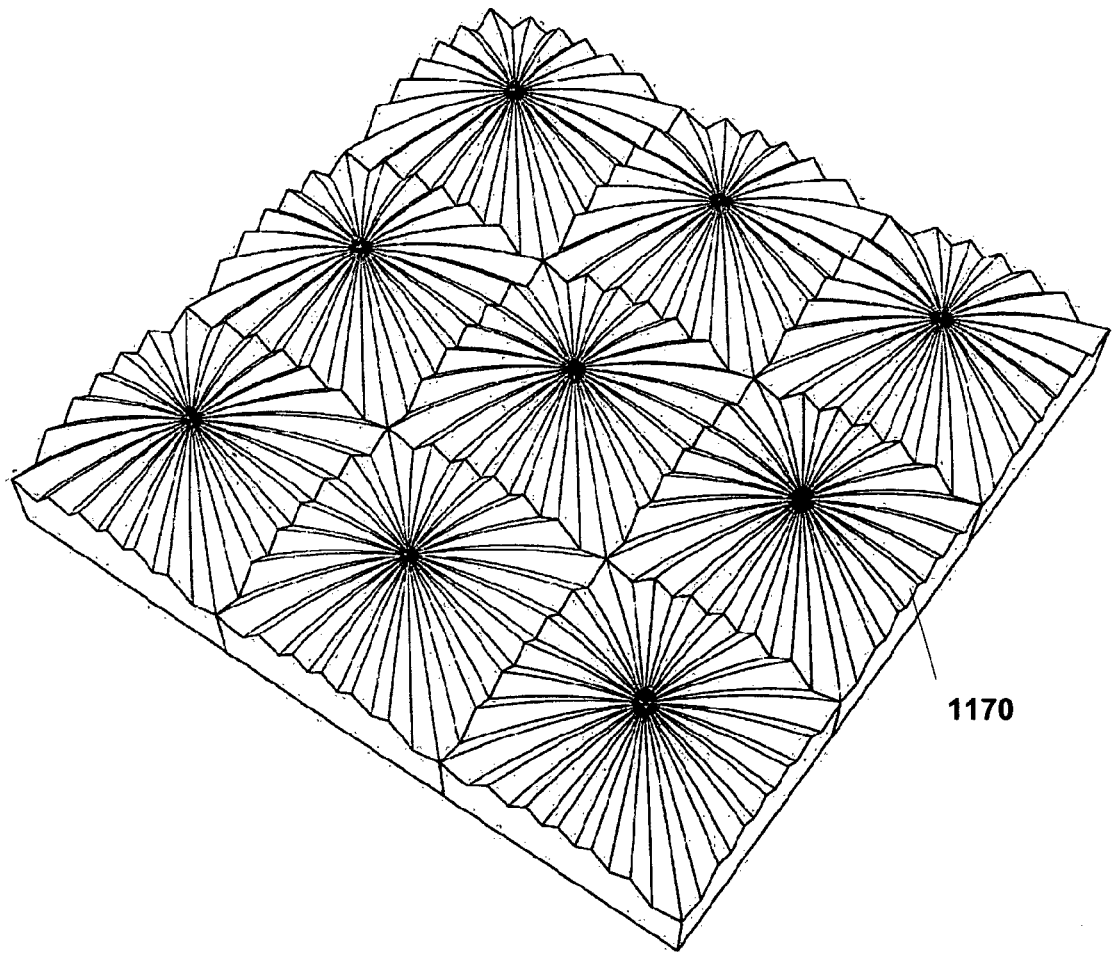
FIG. 23B shows a bottom side perspective view of an array of rectangular facet based concentrators.

Individual concentrators may be combined to form arrays of concentrators. For example, FIG. 22A shows the top-side perspective of a tessellation of hexagonal symmetry concentrator lenses. FIG. 22B shows the bottom-side perspective view of a tessellation of hexagonal symmetry concentrator lenses. FIG. 23A shows the top-side perspective of a tessellation of rectangular symmetry concentrator lenses. FIG. 23B shows the bottom-side perspective of a tessellation of rectangular symmetry concentrator lenses. Arbitrary tessellations are possible however, some tessellations provide a better symmetry to align the facets from one concentrator to the neighboring concentrator.

Figure 24A:
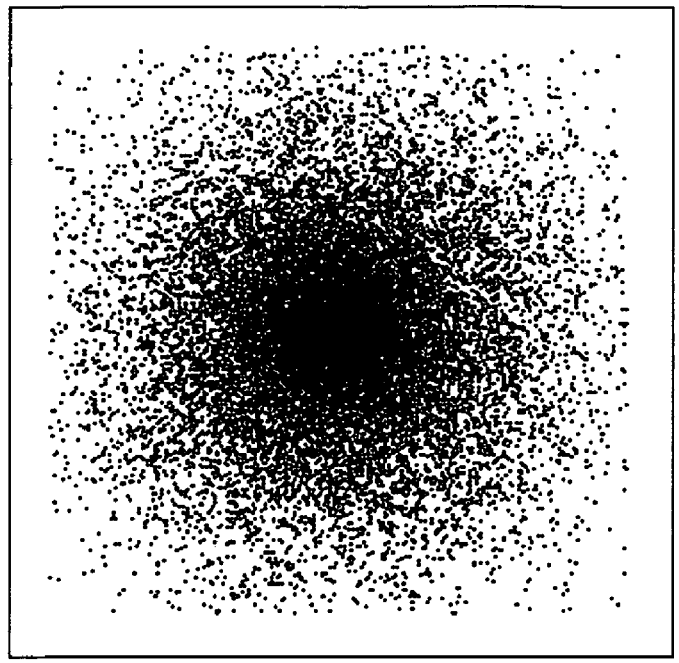
FIG. 24A shows a spot-diagram of ray strikes at the focal region when only the shape of the focal region is used as an optimization goal for facet design.
Figure 24B:
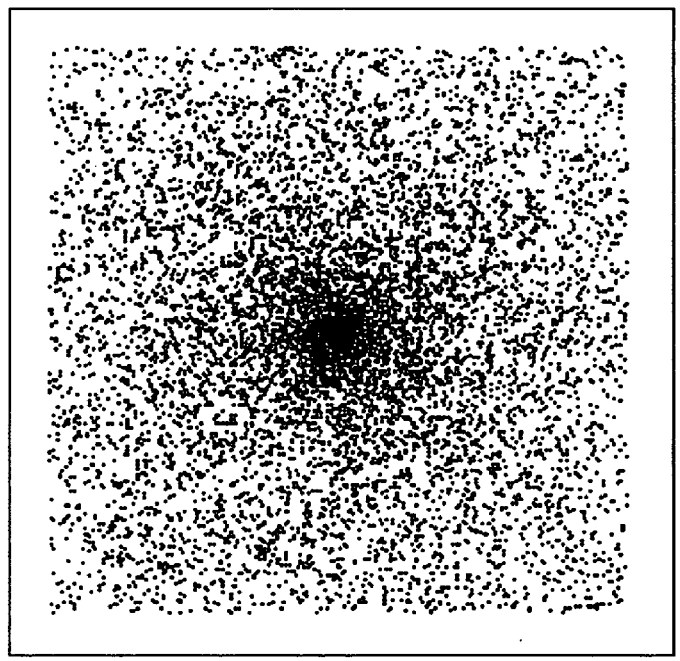
FIG. 24B shows a spot-diagram of ray strikes at the focal region when both the shape of the focal region and the uniformity of the radiation is used as an optimization goal for facet design.

One of the important features of this invention is that a large number of degrees of freedom for constructing each facet surface is possible, as was described previously in this document in mathematical detail. However, up to this point in the description it has tacitly been assumed that the each of the facets of a concentrator is identical. A practical application of using different facet face surfaces on a plurality of facets is to match the resulting spot of light at the focal region to the shape of an energy conversion device at the focal region. For example, a high efficiency photovoltaic cell is typically square in shape so that it is important to match the focused light spot to the photovoltaic shape in order to insure the maximum possible energy conversion performance. In FIG. 21 each of the facet surfaces 2110, 2120, 2130, 2140, 2150, and 2160 can take on a different shape. If this set of facets is then repeated periodically for each quadrant of the concentrator in FIG. 21, then the resulting spot at the focal region can be made to exhibit a square symmetry, which is matched to the shape of a square solar cell's integrated circuit chip. FIG. 24A shows the resulting spot diagram for such a design when only the square focal region is used for optimization. FIG. 24B show the resulting spot pattern when both the focal region and the distribution of light are goals of the facet optimization. Although not perfectly uniform the desired distribution can be approximated more and more closely by increasing the number of control curves $M_{phi}$ and the number of terms used in the Taylor expansion for the GFA, g(r), and the scaling functions λ. Additionally, symmetry breaking has the effect of eliminating constraining constants of the optical system. This is a general result of breaking the symmetry of any Hamiltonian and is a well know result, called Noether's theorem, from theoretical physics.

Those familiar with the mathematical sciences and engineering can see that there are many possible combinations of the elements presented in this invention. Accordingly, it will be appreciated by those skilled in the art, in view of the teaching presented herein, that there are alternative embodiments that may be implemented without deviating from the scope and spirit of the invention. Furthermore, this invention is only to be limited by the claims, which include all such embodiments and modifications when viewed in conjunction with the specification just given and with the accompanying drawings.

CONCLUSION, RAMIFICATION, AND SCOPE

Accordingly, the reader will see that this invention for concentrating (or collimation) of light using three of more mutually opposing surfaces has the following advantages:

1. it permits precise control of light focusing using total internal reflection;
2. it permits shaping the spatial extent and power distribution at the focal region by choice of the shape of the surface;
3. it permits direct light to pass to the receiver using total internal reflection or mirror refections and indirect light to refract through the system thereby allowing colors, textures and objects to appear translucent to a remote observer;
4. it permits folding the optics to allow a compact device;
5. it permits concentration that is at or near the physical limits allow by the laws of nature because of the phase-space optimization;
6. it permits the use of relatively large surface area facets which are mechanically robust;
7. it permits symmetry breaking to improve concentration;
8. it permits transparent electrical and thermal control to be incorporated onto its surface;
9. it permits easy manufacturing due to said large facet surfaces.

While the above description contains many specifics, these should not be construed as limiting the scope of the invention but as merely providing illustrations of some of the presently preferred embodiments of this invention. The present invention is thus not limited to the embodiments described above, but can be changed or modified in various ways on the basis of the general principles of the invention, and such changes or modifications are not excluded from the scope of the invention. Thus the scope of the invention should be determined by the appended claims and their legal equivalents, and not by the examples given.

The invention claimed is:

1. An optical device, defined in a polar coordinate system, having its optical axis coincident with said polar coordinate system's z-axis axis, whereby said optical device transforms a first distribution of light, propagating along said optical axis, into a second distribution of light, propagating towards a focal region, comprising:

a. a first optically active surface that is radially symmetric about the optical axis and providing continuous first and second partial derivatives of its surface function at all surface points and in all directions that are tangent to said first optically active surface at each said surface point, except at the location of said optical axis.

b. a second optically active surface, displaced along said optical axis apart from said first optically active surface, and providing a plurality of radially directed facets each having two active and symmetric local surfaces arranged at an inclined Geometric Facet Angle to each other and extending radially away from the vicinity of the optical axis and having continuous first and second partial derivatives of its surface function in the polar angle direction, except for discrete polar angles of said polar coordinate system where said first partial derivative in the polar angle direction is discontinuous, c. said second optically active surface providing continuous first and second partial derivatives of its surface function in the radial direction of said polar coordinate system of said optical device, d. each of said facets having said Geometric Facet Angle that continuously varies as a function of the radial coordinate of said optical device, f. a focal region which is symmetrically located about said optical axis, and g. a transparent dielectric medium having its boundaries defined predominately by said first optically active surface and said second optically active surface and having a refractive index that is higher than the refractive index of a surrounding medium, whereby said first distribution of light is transformed jointly by said first optically active surface and said second optically active surface to said focal region by a series of light redirections comprising at least: a refraction through said first surface, two total internal reflections on said two active and symmetric local surfaces of said radially directed facets, thereby allowing said first distribution of light to be transformed into said second distribution of light at said focal region.

2. The method of claim 1 wherein the direction of the light is reversed to transform a second distribution of light from said focal region to a first distribution of light along the optical axis in order to provide a collimator.

3. The method of claim 1 further comprising a sub-reflector located on or in close proximity to said first optically active surface, wherein the sub-reflector is a mirror.

4. The method of claim 1 further comprising a sub-reflector located on or in close proximity to said first optically active surface, wherein the sub-reflector is a diffuser.

5. The method of claim 1 wherein a plurality of facet geometries is utilized to control the overall second distribution of light.

6. The optical device of claim 1 further comprising a hole in said solid, optically transmissive material to allow for external connection to an energy conversion device located at said focal region within said optically transmissive material.

7. The optical device of claim 1 wherein said transparent dielectric medium further comprises one or more gas filled or vacuum filled cavities to provide light-loss protection for total internal reflection from dirt from the surrounding environment.

8. The optical device of claim 1 further comprising a receiving device located at said focal region, thereby providing a concentrator.

9. The optical device according to claim 1, wherein said Geometric Facet Angle monotonically decreases in extent from approximately a 90 degree angle to approximately a 10 degree variation below 90 degree angle.

10. The optical device of claim 1 wherein a portion of one or more of said optically active surfaces redirects light by diffraction.

11. The optical device of claim 1 wherein a portion of one or more of said optically active surfaces redirects light by mirror reflections.

12. The optical device of claim 1 wherein a portion of one or more of said optically active surfaces redirects light by total internal reflection.

13. The optical device of claim 1 wherein said focal region is located internal to said optical device.

14. The optical device of claim 1 wherein said focal region is located external to said optical device.

15. The optical device of claim 1 wherein a plurality of said optical devices are formed into an array.

* * * * *